United States Patent
Hasegawa

(10) Patent No.: US 10,021,307 B2
(45) Date of Patent: Jul. 10, 2018

(54) PROCESSING APPARATUS FOR CAMERA SHAKE CORRECTION

(71) Applicant: Sony Corporation, Tokyo (JP)

(72) Inventor: Youichi Hasegawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 35 days.

(21) Appl. No.: 14/017,688

(22) Filed: Sep. 4, 2013

(65) Prior Publication Data

US 2014/0071303 A1    Mar. 13, 2014

(30) Foreign Application Priority Data

Sep. 11, 2012  (JP) ................................. 2012-199125

(51) Int. Cl.
 *H04N 5/232*  (2006.01)

(52) U.S. Cl.
 CPC ..... *H04N 5/23287* (2013.01); *H04N 5/23212* (2013.01)

(58) Field of Classification Search
 CPC ............. H04N 5/23212; H04N 5/3696; H04N 5/3572; H04N 5/367; H04N 5/2351; H04N 5/3456; H04N 5/2353; H04N 5/347; H04N 5/3535; H04N 5/35581; H04N 5/3745; H04N 3/1512; H04N 5/235; H04N 5/243
 USPC ........ 348/208.4, 208.11, 208.12, 302, 221.1, 348/345, 353, 362, 364, 365
 See application file for complete search history.

(56) References Cited

U.S. PATENT DOCUMENTS

| | | | |
|---|---|---|---|
| 6,829,008 B1 | 12/2004 | Kondo et al. | |
| 7,236,696 B2* | 6/2007 | Higuma | G02B 7/08 |
| | | | 348/E5.044 |
| 7,512,328 B2* | 3/2009 | Suda | 396/52 |
| 7,720,309 B2* | 5/2010 | Sasaki | H04N 5/23248 |
| | | | 382/209 |
| 2002/0163581 A1* | 11/2002 | Kitazawa et al. | 348/208.6 |
| 2010/0150538 A1* | 6/2010 | Ono et al. | 396/104 |

(Continued)

FOREIGN PATENT DOCUMENTS

| | | |
|---|---|---|
| JP | 07-209691 A | 8/1995 |
| JP | 3592147 B2 | 11/2004 |

(Continued)

OTHER PUBLICATIONS

Japanese Office Action dated Oct. 1, 2015 in patent application No. 2012199125.

*Primary Examiner* — Padma Haliyur
(74) *Attorney, Agent, or Firm* — Chip Law Group

(57) ABSTRACT

According to an embodiment of the present technology, there is provided a processing apparatus or a program causing a computer to execute as a processing apparatus including a camera shake correction control unit configured to, based on a focus area in which pixel values of phase difference pixels is used in focus control among areas of an image output by an image sensor, control camera shake correction performed by changing a relative positional relationship in a direction perpendicular to an optical axis in an optical system between the image sensor that includes as some of pixels, phase difference pixels that are pixels for obtaining phase difference information to be used in focus control based on a phase difference method, and the optical system, which is for forming an image on the image sensor from light from an object.

21 Claims, 13 Drawing Sheets

(56) References Cited

U.S. PATENT DOCUMENTS

| | | | | |
|---|---|---|---|---|
| 2011/0013061 A1* | 1/2011 | Hoda | ............... | G02B 7/34 |
| | | | | 348/294 |
| 2012/0057034 A1* | 3/2012 | Tanaka | ............... | H04N 5/225 |
| | | | | 348/208.1 |
| 2012/0147227 A1* | 6/2012 | Yoshimura et al. | ............... | 348/246 |
| 2013/0163972 A1* | 6/2013 | Miyazawa | ............... | H04N 5/23258 |
| | | | | 396/55 |

FOREIGN PATENT DOCUMENTS

| JP | 2006-171290 A | 6/2006 |
|---|---|---|
| JP | 2010-154414 A | 7/2010 |
| JP | 2011-075841 A | 4/2011 |
| JP | 2011-081201 A | 4/2011 |

\* cited by examiner

FIG. 8
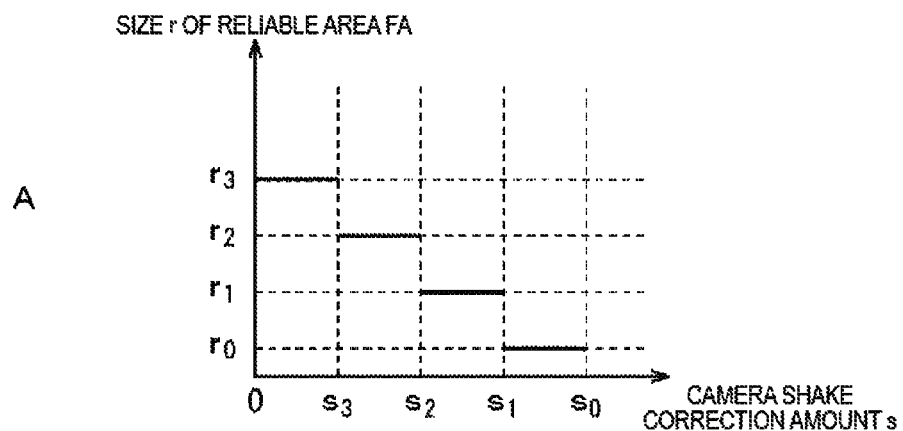
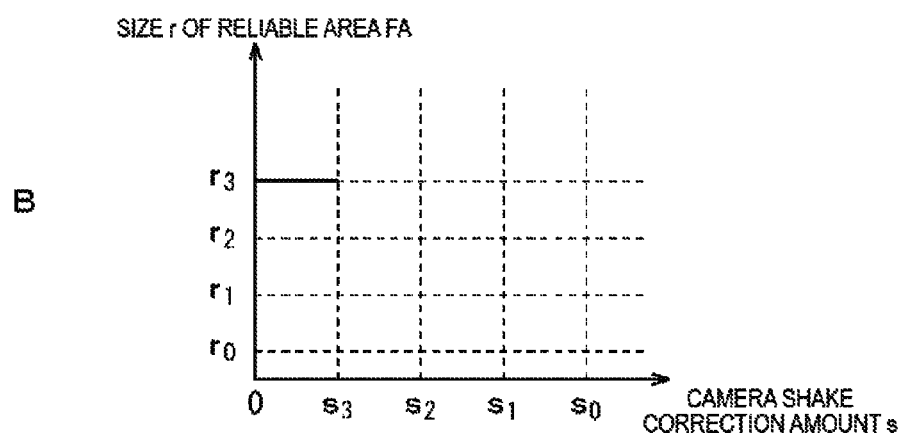
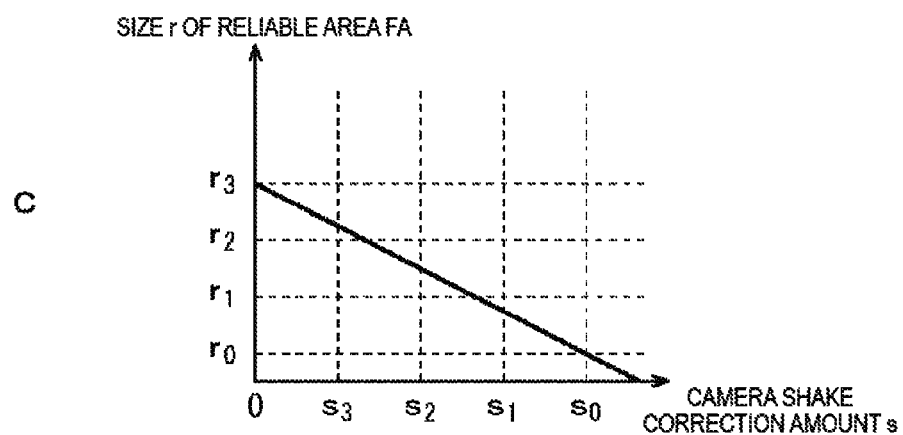

FIG. 11
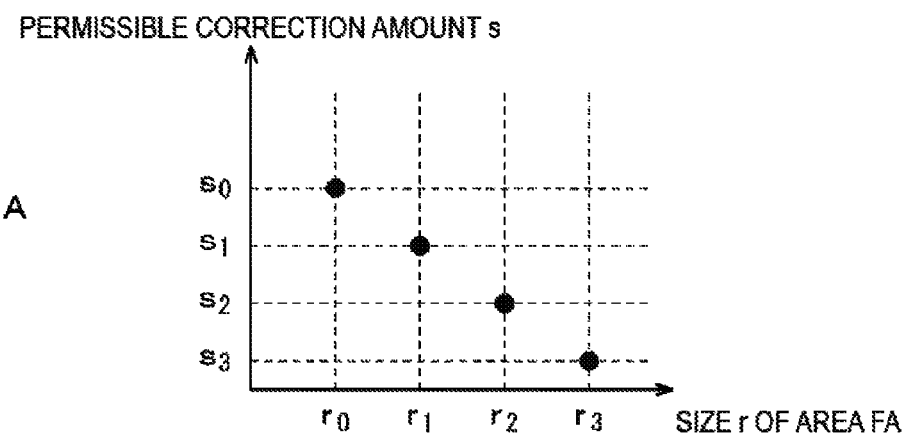
A
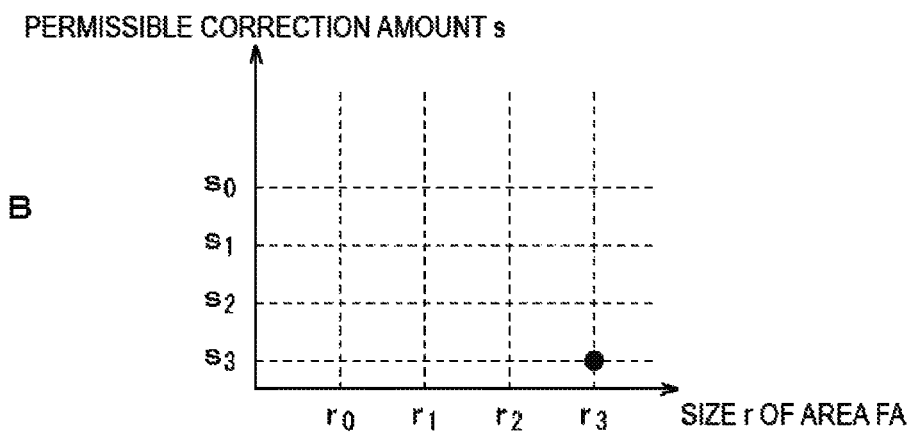
B
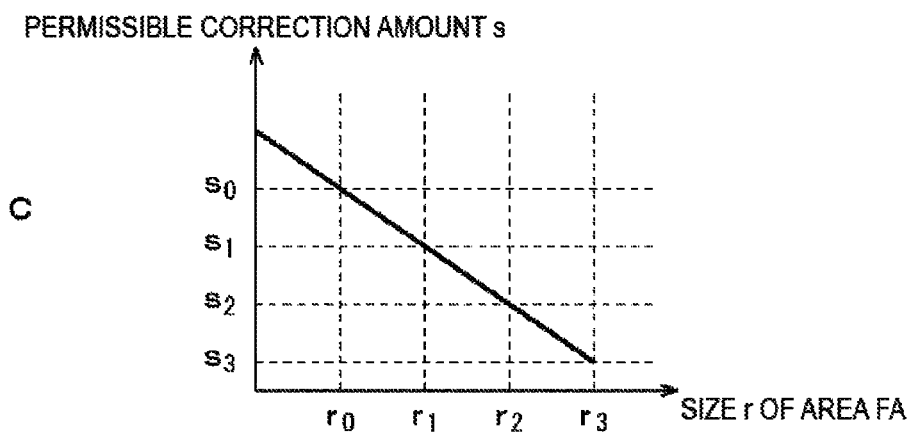
C

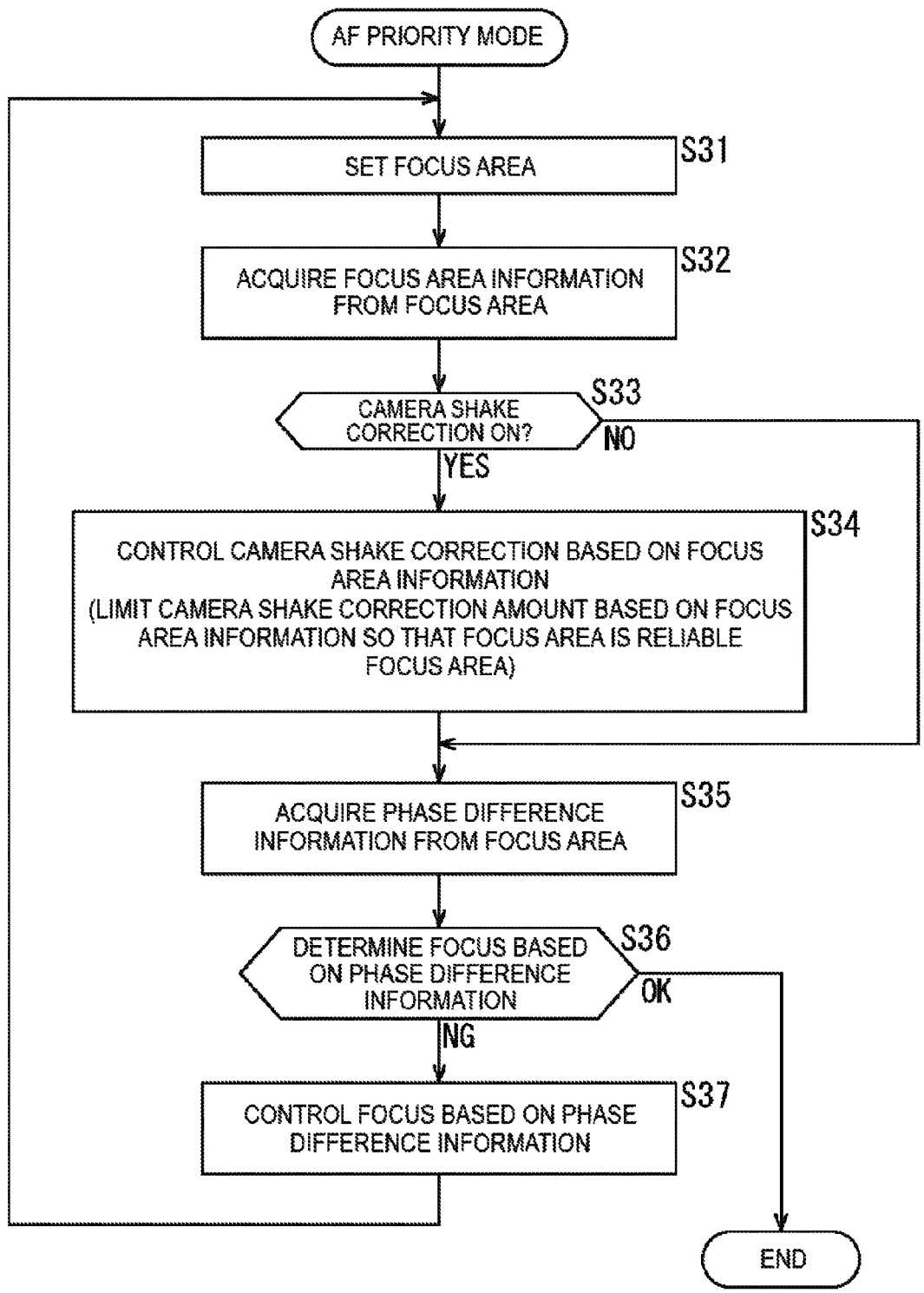

PROCESSING APPARATUS FOR CAMERA SHAKE CORRECTION

BACKGROUND

The present technology relates to a processing apparatus, a processing method, and a program. More specifically, the present technology relates to a processing apparatus, a processing method, and a program capable of realizing rapid and accurate autofocus while also allowing camera shake correction to function as much as possible as, for example.

For example, in a digital (still) camera such as a compact camera, a mirrorless camera, and a single-lens reflex camera, examples of autofocus (hereinafter also referred to as "AF") that automatically sets the focus state to an in-focus state include a contrast method and a phase difference method.

In a contrast method, focus control for driving a focus lens is performed so that the contrast of an image captured by the digital camera is at a maximum.

In such a contrast method, since the contrast of the image used in focus control can be obtained from the image captured by the digital camera, a special mechanism is not used.

However, in a contrast method, the image is captured while moving the focus lens. Since the contrast of that image has to be detected, it takes a comparatively longer time to set the focus state to an in-focus state.

In a phase difference method, based on phase difference information representing a phase difference (phase interval) between a first image formed by, for example, light (object light) from an object that has passed through a first edge portion of an exit pupil in the digital camera's optical system and a second image formed by, for example, object light that has passed through a second edge portion opposite from the first edge portion across the optical axis of the optical system, focus control that drives the focus lens is performed so that the phase difference of an image (phase difference between the first image and the second image) matches the phase difference during an in-focus state.

In such a phase difference method, since the direction and the magnitude (amount) for driving the focus lens can be recognized from the phase difference of the image (the phase difference between the first image and the second image), the focus state can be rapidly set to an in-focus state.

However, in a phase difference method, special mechanisms are used, namely, a dedicated sensor, which is different to the image sensor for capturing the image, that receives object light that has passed through the first and the second edge portions, respectively, of the exit pupil, and a mechanism that splits off object light that has passed through the first and the second edge portions, respectively, of the exit pupil to the dedicated sensor.

Thus, since a contrast method does not use a special mechanism, a contrast method is widely employed in compact cameras and mirrorless cameras for which there is a strong demand for compactness.

On the other hand, although a phase difference method can rapidly set the focus state to an in-focus state, a phase difference method uses special mechanisms, and thus compactness is difficult to achieve. Therefore, a phase difference method is often used in single-lens reflex cameras.

However, as described above, a phase difference method can perform rapid AF (quickly setting the focus state to an in-focus state). Therefore, there is a strong demand to use a phase difference method in compact cameras and mirrorless cameras.

Accordingly, for example, Japanese Patent No. 3592147 proposes a phase difference method that employs an image sensor that includes phase difference pixels, which are for detecting the phase difference of the image, as some of the pixels, and detects phase difference information representing a phase difference of the image from the pixel value of the phase difference pixels included in the image sensor.

In the phase difference method described in Japanese Patent No. 3592147, the image sensor includes a predetermined number of sets of phase difference pixels for receiving object light that has passed through a first edge portion of an exit pupil and phase difference pixels for receiving object light that has passed through a second edge portion. Based on the pixel value of the phase difference pixels included in the image sensor, the phase difference information is detected.

Thus, in a phase difference method using an image sensor that includes phase difference pixels as some of its pixels, a special mechanism such as a dedicated sensor does not need to be used, so that the digital camera can be made compact.

Further, digital cameras usually have a camera shake correction function for performing camera shake correction by changing the relative positional relationship in the direction perpendicular to the optical axis between the image sensor and the optical system.

When camera shake correction is ON (is functioning), an error is produced in the phase difference information detected from the pixel value of the phase difference pixels, namely, in the defocus amount representing the degree of out-of-focus, due to fluctuations in the distribution of the amount of object light received by the phase difference pixels caused by changes in the relative positional relationship in the direction perpendicular to the optical axis between the image sensor and the optical system.

Further, when an error is produced in the phase difference information (defocus amount), the accuracy of the phase difference method AF, in which focus control is performed based on that phase difference information, deteriorates.

Accordingly, JP-A-2011-081201 proposes a technology for performing phase difference method-based AF by, based on optical information from the imaging lens, determining whether shading (vignetting) is produced in the phase difference pixels by the camera shake correction, and switching off (stopping) camera shake correction when shading is produced in the phase difference pixels.

SUMMARY

If camera shake correction is switched off, especially when the shutter speed is slow (the exposure time is long), shooting in a low luminance environment, or performing telescopic shooting that is susceptible to the effects of camera shake, for example, the likelihood of capturing a blurry image increases.

Therefore, there is a demand for realizing rapid and accurate AF while also allowing camera shake correction to function as much as possible.

An embodiment of the present technology, which was created in view of such circumstances, enables rapid and accurate AF to be realized while also allowing camera shake correction to function as much as possible.

According to an embodiment of the present technology, there is provided a processing apparatus or a program causing a computer to execute as a processing apparatus including a camera shake correction control unit configured to, based on a focus area in which pixel values of phase difference pixels is used in focus control among areas of an image output by an image sensor, control camera shake correction performed by changing a relative positional relationship in a direction perpendicular to an optical axis in an optical system between the image sensor that includes as some of pixels, phase difference pixels that are pixels for obtaining phase difference information to be used in focus control based on a phase difference method, and the optical system, which is for forming an image on the image sensor from light from an object.

According to an embodiment of the present technology, there is provided a processing method including controlling, based on a focus area in which pixel values of phase difference pixels is used in focus control among areas of an image output by an image sensor, camera shake correction performed by changing a relative positional relationship in a direction perpendicular to an optical axis in an optical system between an image sensor that includes as some of pixels, phase difference pixels that are pixels for obtaining phase difference information to be used in focus control based on a phase difference method, and the optical system, which is for forming an image on the image sensor from light from an object.

According to an embodiment of the present technology, based on a focus area in which pixel values of phase difference pixels is used in focus control among areas of an image output by an image sensor, it controls camera shake correction performed by changing a relative positional relationship in a direction perpendicular to an optical axis in an optical system between the image sensor that includes as some of pixels, phase difference pixels that are pixels for obtaining phase difference information to be used in focus control based on a phase difference method, and the optical system, which is for forming an image on the image sensor from light from an object.

It is noted that the processing apparatus may be an independent apparatus or may be one internal block that configures an apparatus.

Further, the program can be provided by transmitting via a transmission medium or by recording on a recording medium.

According to the embodiments of the present disclosure described above, rapid and accurate AF can be realized while also allowing camera shake correction to function as much as possible.

BRIEF DESCRIPTION OF THE DRAWINGS

FIG. 8 is a diagram illustrating AF reliability determination for determining a reliable focus area based on a camera shake correction amount in camera shake correction priority mode;

FIG. 11 is a diagram illustrating a camera shake correction amount that is limited based on a focus area in AF priority mode;

FIG. 13 is a flowchart illustrating AF processing in an AF priority mode.

DETAILED DESCRIPTION OF THE EMBODIMENT(S)

Figure 1:
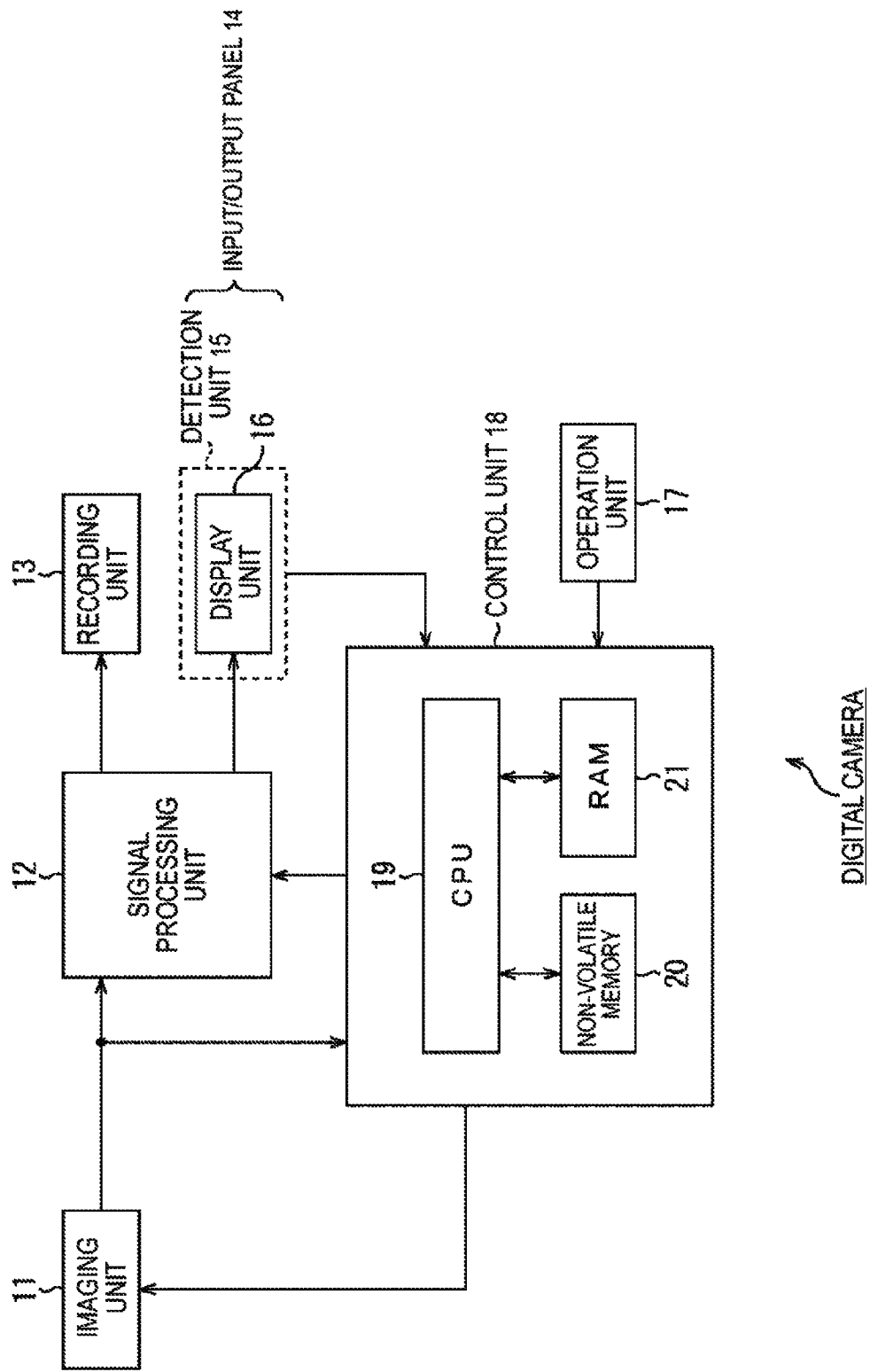
FIG. 1 is a block diagram illustrating a configuration example according to an embodiment of the present technology of a digital camera in which a processing apparatus according to an embodiment of the present technology is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

(Embodiment of a Digital Camera in which an Embodiment According to the Present Technology is Applied)

FIG. 1 is a block diagram illustrating a configuration example according to an embodiment of the present technology of a digital camera in which a processing apparatus according to an embodiment of the present technology is applied.

In FIG. 1, the digital camera, which has an imaging unit 11, a signal processing unit 12, a recording unit 13, an input/output panel 14, an operation unit 17, and a control unit 18, captures images (still images and moving images including audio).

The imaging unit 11 captures an image corresponding to light incident thereon under the control of the control unit 18, and supplies an image (signal) obtained from that result to the signal processing unit 12.

The signal processing unit 12 performs signal processing on the image from the imaging unit 11 under the control of the control unit 18, and optionally supplies the processed image to the recording unit 13 and the input/output panel 14.

A removable recording medium (not illustrated), such as a memory card, an optical disc, and a magnetic disk, for example, can be mounted/dismounted onto/from the recording unit 13. The recording unit 13 records images supplied from the signal processing unit 12 on the recording medium.

Further, the recording unit 13 reproduces an image stored on the recording medium, and supplies and displays the reproduced image on the input/output panel 14 via the signal processing unit 12.

The input/output panel 14 has a detection unit 15 and a display unit 16.

The detection unit 15 is a device that has a function for sensing (detecting) external inputs, namely, is configured from, for example, a capacitive touch panel or the like, and a set of a light source that irradiates light and a sensor that receives reflected light from an object that has come from the light source.

The detection unit 15 detects an approach or a touch by an external object, namely, a user's finger, a touch pen handled by the user or the like, when the external object approaches or touches the detection unit 15. Further, the detection unit 15 supplies a detection signal representing that position to the control unit 18.

The display unit 16, which is configured from a device that display images, namely, a liquid crystal panel, for example, displays the image supplied from the signal processing unit 12.

The input/output panel 14, in which a detection unit 15 and a display unit 16 like those described above are integrally configured, can display images on the display unit 16, and can detect external operation inputs (a touch or an approach) made on the image displayed on the display unit 16.

The operation unit 17, which is a physical button such as a release button (a shutter button), for example, operated by the user, supplies an operation signal corresponding to a user operation to the control unit 18.

The control unit 18, which has a CPU (central processing unit) 19, a non-volatile memory 20, and a RAM (random-access memory) 21, controls the imaging unit 11 and the signal processing unit 12 based on a detection signal from (the detection unit 15 in) the input/output panel 14, and an operation signal from the operation unit 17, for example.

The CPU 19 controls each block forming the digital camera by executing a program stored in the non-volatile memory 20.

The non-volatile memory 20 stores programs executed by the CPU 19 and the data (including programs) that are also stored when the digital camera power source is turned off, such as data that is stored in order to carry out the operations of the CPU 19, and imaging parameters set by operating the operation unit 17 and the like.

The RAM 21 temporarily stores the data that is used to carry out the operations of the CPU 19.

In the thus-configured digital camera, in the control unit 18, the CPU 19 controls each of the units in the digital camera by executing a program recorded in the non-volatile memory 20 and the like.

The imaging unit 11 captures an image corresponding to light incident thereon under the control of the control unit 18, and supplies an image (signal) obtained from that result to the signal processing unit 12 and the control unit 18.

The signal processing unit 12 performs (digital) signal processing on the image signal from the imaging unit 11, and supplies the processed image signal to (the display unit of) the input/output panel 14. On the input/output panel 14, an image corresponding to the image signal from the signal processing unit 12, namely a through-the-lens image, is displayed.

Further, the control unit 18 executes predetermined processing based on a signal from (the detection unit 15 in) the input/output panel 14 or the operation unit 17.

Namely, when the input/output panel 14 and the operation unit 17 are operated so that imaging is performed, for example, the control unit 18 compresses and encodes the image signal from the imaging unit 11 by controlling the signal processing unit 12, and records the compresses and encoded image signal on the recording medium mounted in the recording unit 13.

In addition, the control unit 18 displays icons and the like as a UI (user interface) on (the display unit 16 in) the input/output panel 14 by controlling the signal processing unit 12.

Further, the control unit 18 reproduces an image from the recording medium in the recording unit 13 by controlling the signal processing unit 12, and displays the reproduced image on the input/output panel 14.

It is noted that the digital camera has, for example, an AF (autofocus) function, an AE (autoexposure) function, an AWB (auto white balance) function, a camera shake correction function and the like. These functions are realized in the control unit 18 by, for example, the CPU 19 executing a program.

The programs executed by the CPU 19 may be pre-installed in the digital camera, for example, by installing the programs in the digital camera from a removable recording medium, or by downloading the programs via a network and installing them in the digital camera.

(Configuration Example of the Imaging Unit 11)

Figure 2:
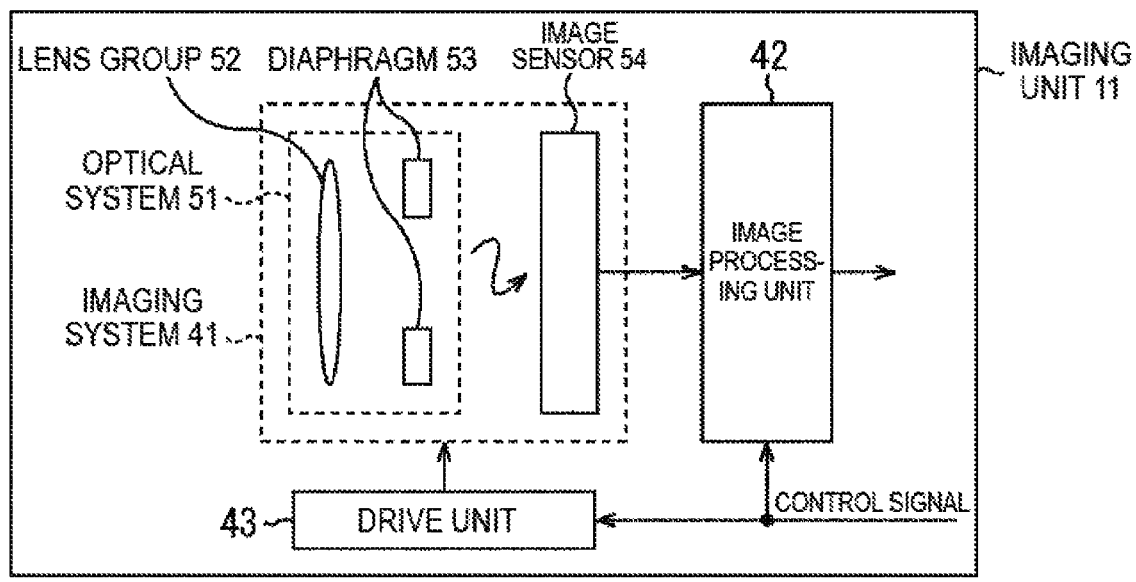
FIG. 2 is a block diagram illustrating a configuration example of an imaging unit 11.

FIG. 2 is a block diagram illustrating a configuration example of the imaging unit 11 in FIG. 1.

The imaging unit 11, which has an imaging system 41 and a drive unit 43, captures and outputs images.

The imaging system 41 has an optical system 51 and an image sensor 54 as an imaging element.

The optical system 51, which has a lens group 52 and a diaphragm 53, adjusts the light incident thereon, and causes it to hit the image sensor 54.

Namely, the lens group 52, which is configured from a focus lens that moves in the optical axis direction to adjust the focus, and a zoom lens for adjusting the zoom, forms the object light into an image on the image sensor 54 via the diaphragm 53.

It is noted that the lens group 52 may also include a shake correction lens for correcting camera shake by moving in the direction perpendicular (a perpendicular direction) to the optical axis of the optical system 51, for example. In this case, in the digital camera, camera shake correction is performed by moving the shake correction lens in the direction perpendicular to the optical axis.

The diaphragm 53 adjusts the amount of light that is incident on the image sensor 54 from the lens group 52 by adjusting the size of the aperture.

The image sensor 54, which is configured from a CMOS (complementary metal oxide semiconductor) sensor, for example, captures an image of the object, and outputs an image signal obtained from that result.

Namely, the image sensor 54 receives light incident from the optical system 51, converts that light into an image signal as an electric signal based on the amount of received light, and outputs the image signal. The image signal output by the image sensor 54 is supplied to an image processing unit 42.

Further, some of the pixels of the image sensor 54 are phase difference pixels for obtaining phase difference information to be used in phase difference method-based focus control. Therefore, in the digital camera, focus control based on a phase difference method can be performed.

The image processing unit 42 optionally performs image processing, such as gain adjustment and white balance adjustment on the image signal from the image sensor 54, and supplies the processed image signal to the signal processing unit 12 (FIG. 1).

It is noted that a control signal is supplied from the control unit 18 to the image processing unit 42. The image processing unit 42 performs image processing based on the control signal from the control unit 18.

A control signal is supplied from the control unit 18 to the drive unit 43.

The drive unit 43 drives the imaging system 41 based on the control signal from the control unit 18.

Namely, the drive unit 43 drives the optical system included in the imaging system 41 based on the control signal from the control unit 18.

Specifically, the drive unit 43 adjusts the focus or the zoom magnification by, for example, driving the focus lens or the zoom lens of the lens group 52 that is included in the optical system 51.

Further, the drive unit 43 adjusts the diaphragm (the aperture of the diaphragm 53) by, for example, driving the diaphragm 53 that is included in the optical system 51.

In addition, the drive unit 43 performs camera shake correction by, for example, driving the shake correction lens of the image processing unit 42 that is included in the optical system 51.

Further, the drive unit 43 adjusts the shutter speed of the image sensor 54.

(Functional Configuration Example of the Control Unit 18)

Figure 3:
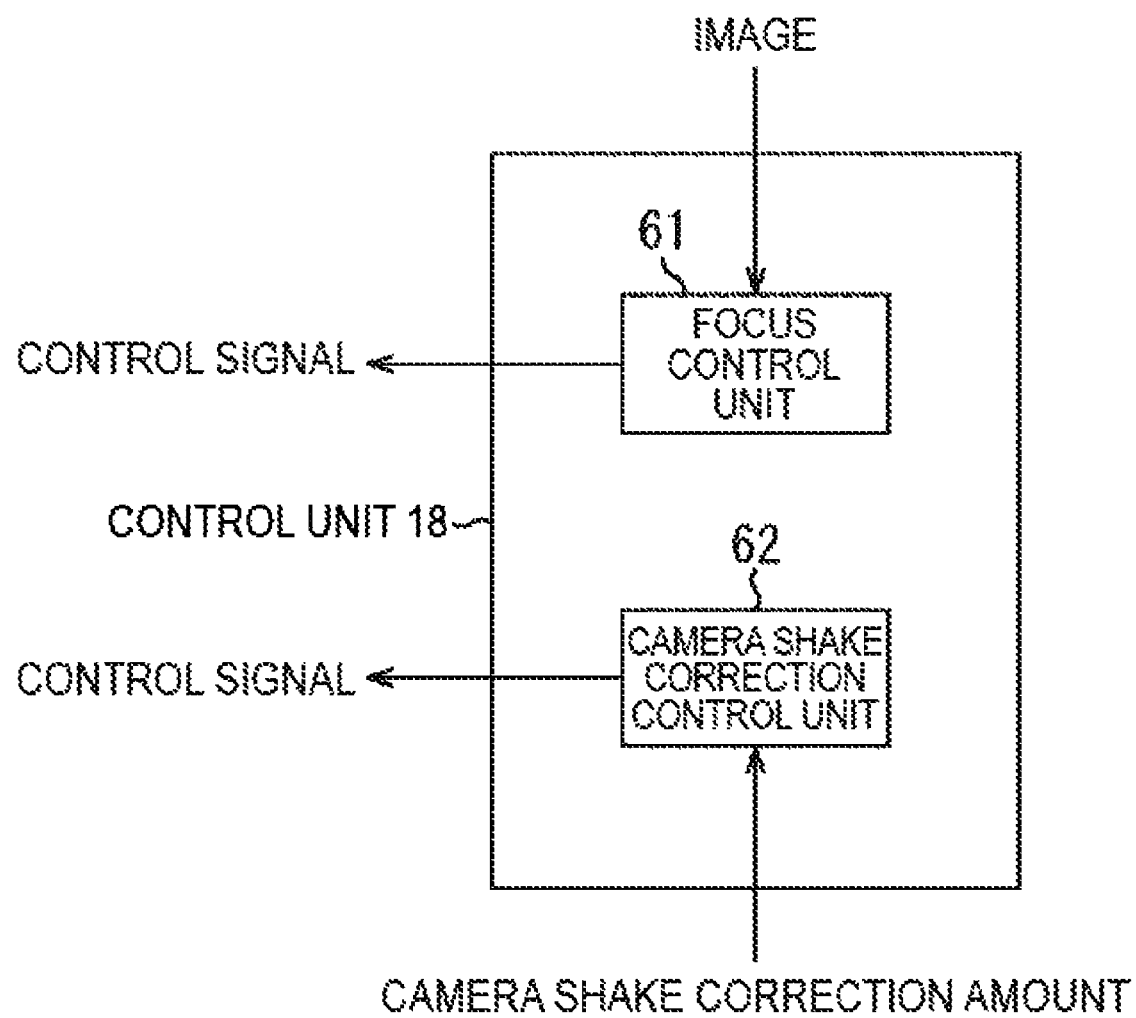
FIG. 3 is a block diagram illustrating a functional configuration example of a control unit 18 for realizing an AF function and a camera shake correction function of a digital camera.

FIG. 3 is a block diagram illustrating a functional configuration example of the control unit 18 for realizing the AF function and the camera shake correction function of the digital camera illustrated in FIG. 1.

The functional configuration of FIG. 3 is realized by the CPU 19 executing a program.

In FIG. 3, the control unit 18 has a focus control unit 61 and a camera shake correction control unit 62.

An image output by the imaging unit 11 is supplied to the focus control unit 61.

The focus control unit 61 performs a reliability determination (hereinafter also referred to as "AF reliability determination") for determining the reliability of phase difference information determined from the pixel value of the phase difference pixels in the image output by the imaging unit 11, and based on the determination result of that AF reliability determination, performs phase difference method-based AF focus control using the phase difference information obtained from the image from the imaging unit 11.

In the focus control unit 61, focus control is performed by supplying a control signal to the drive unit 43 (FIG. 2).

The camera shake correction control unit 62 controls the camera shake correction that is performed by changing the relative positional relationship in the direction perpendicular to the optical axis between the optical system 51 and the image sensor 54.

Namely, the camera shake correction control unit 62 controls camera shake correction by, for example, changing the relative positional relationship (in the direction perpendicular to the optical axis) between the optical system 51 and the image sensor 54 by moving the shake correction lens of the optical system 51 in the direction perpendicular to the optical axis based on the amount of camera shake, which is the amount of movement of the digital camera, that is detected by a not-illustrated gyroscope.

Here, in the camera shake correction controlled by the camera shake correction control unit 62, the relative positional relationship between the optical system 51 and the image sensor 54 is changed so as to is cancel out deviation (camera shake amount) in the position of the image of the object light formed on the image sensor 54 that is caused by movement of the digital camera due to camera shake and the like.

Here, although the relative positional relationship between the optical system 51 and the image sensor 54 is changed by moving (the shake correction lens of) the optical system 51 in the direction perpendicular to the optical axis, in the camera shake correction, the relative positional relationship between the optical system 51 and the image sensor 54 can also be changed by moving the image sensor 54 in the direction perpendicular to the optical axis.

Further, in the camera shake correction control unit 62, the camera shake correction control is performed by supplying a control signal to the drive unit 43 (FIG. 2).

(Configuration Example of the Image Sensor 54)

Figure 4:
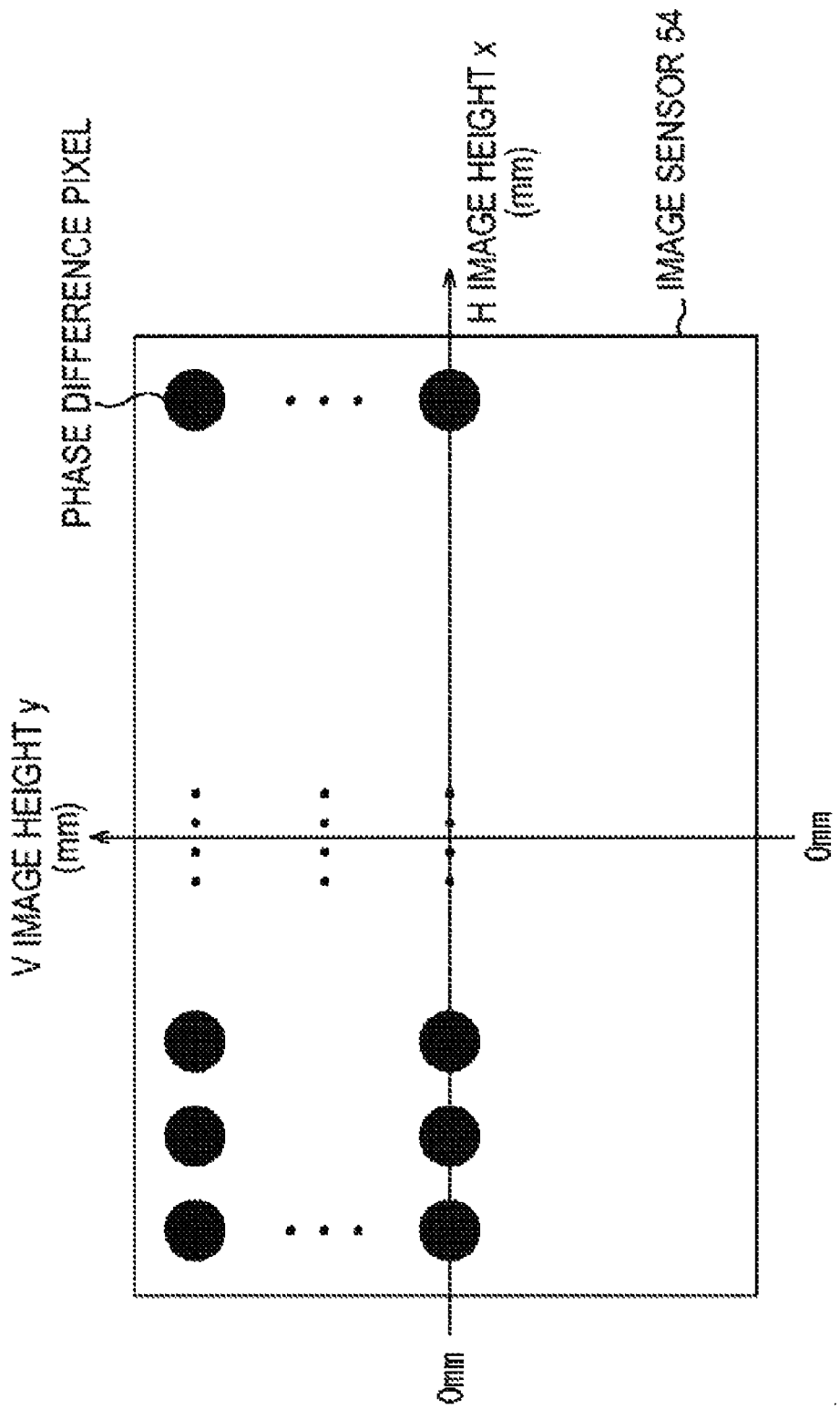
FIG. 4 is a planar diagram illustrating an outline of a configuration example of an image sensor 54.

FIG. 4 is a planar diagram illustrating an outline of a configuration example of the image sensor 54 in FIG. 2.

The image sensor 54 has pixels arranged two-dimensionally in a horizontal direction (x direction) and a vertical direction (y direction). Some of those pixels are phase difference pixels. The phase difference pixels are arranged every several lines.

It is noted that in FIG. 4 (and in the below-described FIG. 6) the phase difference pixels are highlighted (as black circles).

(Relationship Between Phase Difference Information Error and the Camera Shake Correction Amount)

Figure 5:
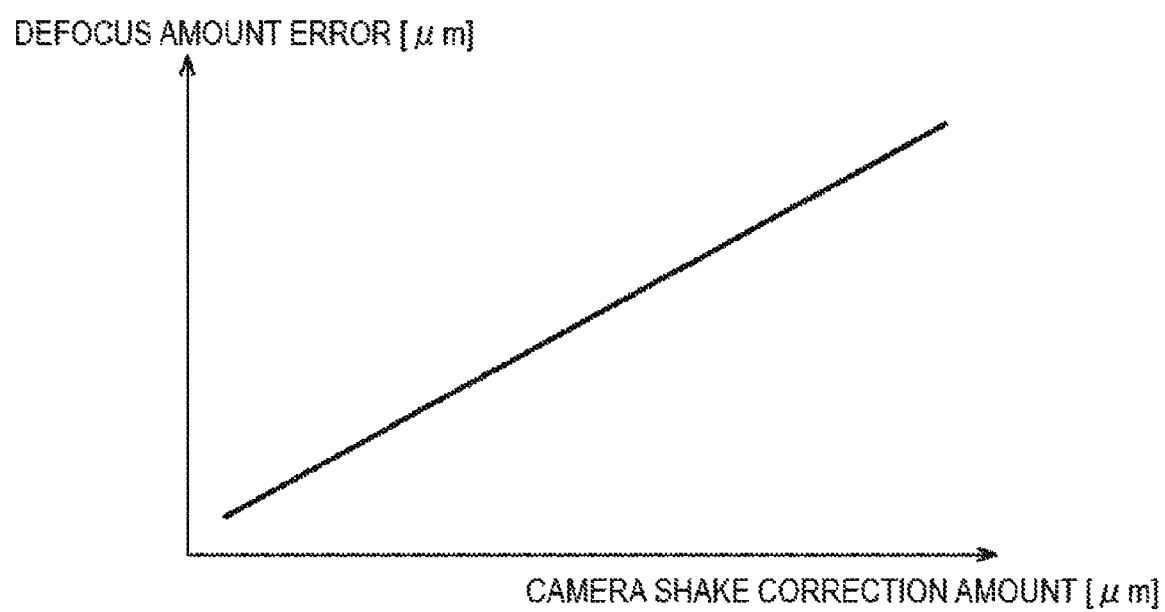
FIG. 5 is a diagram illustrating a relationship between an error in phase difference information obtained from the pixel value of phase difference pixels of the image sensor and the camera shake correction amount based on camera shake correction.

FIG. 5 is a diagram illustrating a relationship between an error in phase difference information (defocus amount) obtained from the pixel value of the phase difference pixels of the image sensor 54 and the camera shake correction amount based on camera shake correction.

When camera shake correction is ON (is functioning), an error is produced in the phase difference information detected from the pixel value of the phase difference pixels, namely, in the defocus amount representing the degree of out-of-focus, due to fluctuations in the distribution of the amount of object light received by the phase difference pixels caused by changes in the relative positional relationship between the optical system 51 and the image sensor 54.

The greater the camera shake correction amount, the larger the error in the phase difference information, and the lower the reliability of the phase difference information. Consequently, the accuracy of the phase difference method-based AF deteriorates.

Accordingly, based on the camera shake correction amount, the focus control unit 61 (FIG. 3) performs an AF reliability determination to determine the reliability of the phase difference information obtained from the image from the imaging unit 11, and performs phase difference method-based AF focus control using the phase difference information based on the determination result of that AF reliability determination.

(AF Reliability Determination to Determine the Reliability of Phase Difference Information)

Figure 6:
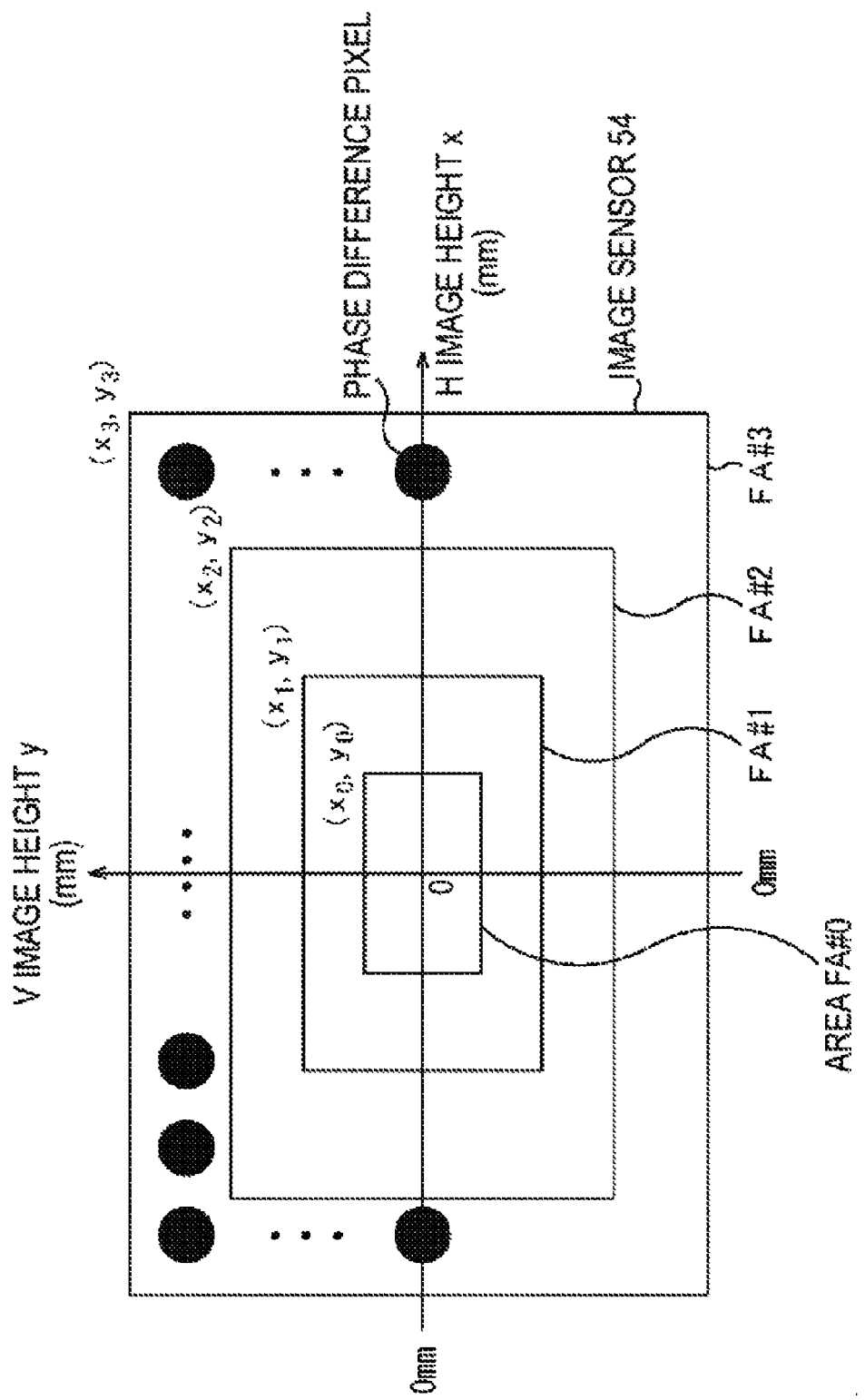
FIG. 6 is a diagram illustrating AF reliability determination to determine the reliability of phase difference information.

FIG. 6 is a diagram illustrating AF reliability determination to determine the reliability of phase difference information.

As illustrated in FIG. 5, in the phase difference information obtained from the image from the imaging unit 11, namely, the phase difference information determined based on the pixel value of the phase difference pixels of the image sensor 54, the greater the camera shake correction amount, the larger the error and the lower the reliability.

Further, the further away a phase difference pixel is from the optical axis, the greater the variation in the amount of object light received by the phase difference pixel that is caused by camera shake correction.

Therefore, when camera shake correction is performed for a camera shake correction amount that is not zero, between phase difference information obtained from only the phase difference pixels close to the optical axis and phase difference information obtained from all of the phase difference pixels arranged on the image sensor 54, namely, phase difference information obtained from the phase difference pixels including the phase difference pixels far away from the optical axis, for example, the phase difference information obtained from only the phase difference pixels close to the optical axis has a higher reliability than the phase difference information obtained from the phase difference pixels including the phase difference pixels far away from the optical axis (the phase difference information obtained from the phase difference pixels including the phase difference pixels far away from the optical axis have a lower reliability than the phase difference information obtained from only the phase difference pixels close to the optical axis).

Here, among the areas of the image output by the image sensor 54, the area of the phase difference pixels whose pixel value is to be used in focus control, namely, the area of the phase difference pixels whose pixel value is to be used to determine the phase difference information used in focus control, will be referred to as a focus area.

Here, to simplify the description, a rectangular area centered about (centered on) the optical axis will be employed as the focus area.

In FIG. 6, in a two-dimensional coordinate system (parallel to the light-receiving face of the image sensor 54) defined by a horizontal direction x axis and a vertical direction y axis with the optical axis as the origin, areas of four sizes, an area FA#0 in which the coordinate at the top right point is $(x_0,y_0)$, an $(x_1,y_1)$ area FA#1, an $(x_2,y_2)$ area FA#2, and an $(x_3,y_3)$ area FA#3, are illustrated as the areas serving as the focus area (areas that can become the focus area).

In this two-dimensional coordinate system, the x coordinate corresponds to the image height (H image height) in the horizontal (H) direction on the image sensor 54, and the y coordinate corresponds to the image height (V image height) in the vertical (V) direction on the image sensor 54.

It is noted that in FIG. 6, $0<x_0<x_1<x_2<x_3$, and $0<y_0<y_1<y_2<y_3$. Therefore, the size of the areas increases in order of area FA#0, FA#1, FA#2, and FA#3. Further, the area FA#3 with the largest size has the same size as the image output by the image sensor 54.

The focus control unit 61 determines the phase difference information using the pixel value of only the phase difference pixels in the focus area among the phase difference pixels arranged on the image sensor 54, and based on that phase difference information, controls the movement (drive) of the shake correction lens as focus control.

For example, if the area FA#0, which includes only phase difference pixels close to the optical axis, and has the smallest size, is the focus area, phase difference information having the highest reliability (when camera shake correction is performed) is obtained. Further, in the focus control performed based on that phase difference information, the shake correction lens is moved so that the focus point is perfectly in-focus at the object appearing in the smallest-sized area FA#0.

In this case, the image captured by the image sensor 54 can sometimes be slightly out of focus at objects appearing in the areas other than area FA#0.

On the other hand, for example, if the area FA#3, which also includes the phase difference pixels farthest away from the optical axis, and has the largest size, is the focus area, phase difference information having the lowest reliability (when camera shake correction is performed) is obtained. Further, in the focus control performed based on that phase difference information, the shake correction lens is moved so that the focus point is "averagely" in-focus at the objects appearing in the largest-sized area FA#3.

In this case, the image captured by the image sensor 54 is in focus at the objects appearing in each portion of that image.

Thus, the reliability of the phase difference information also depends on, in addition to the camera shake correction amount, the focus area from which the phase difference information is obtained. In the AF reliability determination, as the determination of the reliability of the phase difference information, a determination of reliable phase difference information, namely, phase difference information that is within a predetermined tolerance, and thus the focus area from which such reliable phase difference information can be obtained, is performed.

Namely, in the AF reliability determination, based on the camera shake correction amount, the maximum area from which the phase difference information that is within the predetermined tolerance can be obtained is determined as the reliable focus area when camera shake correction of that camera shake correction amount is performed.

As described above, the greater the camera shake correction amount, the lower the reliability of the phase difference information. Further, phase difference information obtained from the phase difference pixels including phase difference pixels far away from the optical axis is less reliable than phase difference information obtained from only phase difference pixels close to the optical axis.

Therefore, when the camera shake correction amount is small, area FA#2 or FA#3 that includes phase difference pixels comparatively far away from the optical axis are determined as the reliable focus area.

On the other hand, when the camera shake correction amount is large, area FA#0 or FA#1 that only include phase difference pixels comparatively close to the optical axis are determined as the reliable focus area.

Further, in the focus control unit 61, phase difference method-based AF focus control is performed based on the determination result of the AF reliability determination.

Namely, in the focus control unit 61, the shake correction lens is moved so that the focus state is in-focus based on the phase difference information determined from the pixel value of the phase difference pixels in the reliable focus area that is obtained from the result of the AF reliability determination.

Here, examples of the operation mode of the digital camera illustrated in FIG. 1 include a camera shake correction priority mode, in which camera shake correction is prioritised over phase difference method-based AF, and an AF priority mode in which phase difference method-based AF is prioritised over camera shake correction. The camera shake correction priority mode and the AF priority mode can be switched based on a user operation, for example.

Thus, in the focus control unit 61, the reliable focus area is determined based on the camera shake correction amount, and based on the phase difference information obtained from that reliable focus area, phase difference method-based AF focus control is performed when the operation mode is the camera shake correction priority mode that prioritises camera shake correction.

(Camera Shake Correction Amount Used in the AF Reliability Determination)

Figure 7:
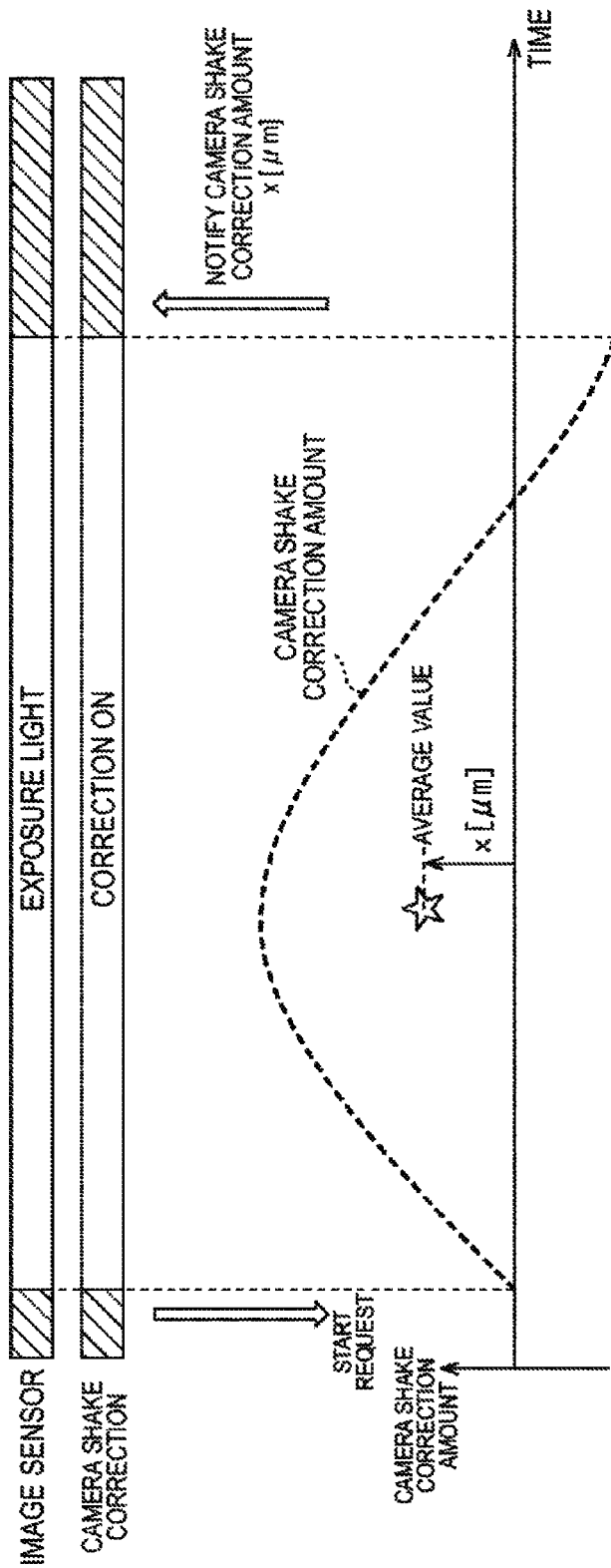
FIG. 7 is a diagram illustrating the camera shake correction amount used in AF reliability determination.

FIG. 7 is a diagram illustrating a camera shake correction amount used in AF reliability determination.

The camera shake correction control unit 62 (FIG. 3) controls the drive unit 43 (FIG. 2) so that the shake correction lens of the optical system 51 is moved in the direction perpendicular to the optical axis by the camera shake correction amount that is just sufficient to cancel out the camera shake correction.

FIG. 7 illustrates change over time in the camera shake correction amount in one axis direction of the x axis or the y axis in a two-dimensional coordinate system defined by a horizontal direction x axis and a vertical direction y axis with the optical axis as the origin.

The camera shake correction control unit 62 takes, for example, the average value of the camera shake correction amount within the exposure time of the capturing of the image by the image sensor 54 performed immediately before as a current camera shake correction amount s, and supplies this value to the focus control unit 61.

Therefore, in the digital camera, for example, if only one still image is captured (recorded) as a photograph, the average value of the camera shake correction amount during the exposure for capturing a through-the-lens image that was performed immediately before serves as the (current) camera shake correction amount s when the still image is captured.

Further, in the digital camera, for example, if a plurality of still images are captured as a photograph by continuous shooting, the average value of the camera shake correction amount during the exposure for capturing the still image immediately before each still image serves as the (current) camera shake correction amount s when each still image is captured.

In addition, in the digital camera, for example, if moving images are captured, the average value of the camera shake correction amount during the exposure for capturing the frame immediately before each frame serves as the (current) camera shake correction amount s when each frame is captured.

The focus control unit 61 acquires the current camera shake correction amount s from the camera shake correction control unit 62, and performs the AF reliability determination based on that camera shake correction amount s.

It is noted that the camera shake correction amount is the amount that cancels out amount of camera shake. Ideally, a vector that represents the camera shake correction amount has the same magnitude in the opposite direction to a vector representing the amount of camera shake. Therefore, in addition to the camera shake correction amount, the AF reliability determination can also be performed based on the amount of camera shake. Performing the AF reliability determination based on the amount of camera shake is equivalent to (equal to) performing the AF reliability determination based on the camera shake correction amount.

(Camera Shake Correction Priority Mode)

FIG. 8 is a diagram illustrating AF reliability determination for determining the reliable focus area based on the camera shake correction amount in camera shake correction priority mode.

FIG. 8A is a diagram illustrating the relationship between the (magnitude of) the camera shake correction amount and the size r of (the area FA that will serve as) the reliable focus area when, as illustrated in FIG. 6, the four areas FA#0, FA#1, FA#2, and FA#3 can serve as the focus area, for example.

Here, in FIG. 8, to simplify the description, attention is paid to only one axis direction, the x axis or the y axis, in a two-dimensional coordinate system defined by a horizontal direction x axis and a vertical direction y axis with the optical axis as the origin.

Further, the camera shake correction amount s increases in order of $s_3$, $s_2$, $s_1$, and $s_0$ (wherein $0 < s_3 < s_2 < s_1 < s_0$), and the focus area size r increases in order of $r_0$, $r_1$, $r_2$, and $r_3$ (wherein $0 < r_0 < r_1 < r_2 < r_3$).

In FIG. 8A, when the camera shake correction amount s is in the minimum range of 0 to $s_3$, in the AF reliability determination, the area FA#3, whose size r is the largest size $r_3$, is determined as the reliable focus area.

Further, when the camera shake correction amount s is in the second smallest range of $s_3$ to $s_2$, in the AF reliability determination, the area FA#2, whose size r is the second largest size $r_2$, is determined as the reliable focus area.

In addition, when the camera shake correction amount s is in the third smallest range of $s_2$ to $s_1$, in the AF reliability determination, the area FA#1, whose size r is the third largest size $r_1$, is determined as the reliable focus area. Still further, when the camera shake correction amount s is in the fourth smallest range of $s_1$ to $s_0$, in the AF reliability determination, the area FA#0, whose size r is the smallest (the fourth largest) size $r_0$, is determined as the reliable focus area.

Still further, when the camera shake correction amount s is in the fourth smallest range of $s_1$ to $s_0$, in the AF reliability determination, the area FA#0, whose size r is the smallest (the fourth largest) size $r_0$, is determined as the reliable focus area.

Moreover, when the camera shake correction amount s is more than (exceeds) $s_0$, in the AF reliability determination, the area whose size r is zero is determined as the reliable focus area. Namely, when the camera shake correction amount s is more than $s_0$, it is determined that there is no reliable focus area.

If area FA#0, FA#1, FA#2, or FA#3 is determined as the reliable focus area, the phase difference information obtained from the phase difference pixels in that focus area is phase difference information within the tolerance. Therefore, at the focus control unit 61, based on that phase difference information, control of the movement of the shake correction lens is performed as the AF focus control.

Further, if it is determined that there is no reliable focus area, since phase difference information within the tolerance cannot be obtained, at the focus control unit 61, AF focus control that is not based on a phase difference method, for example, AF focus control that is based on a contrast method or the like, is performed.

FIG. 8B is a diagram illustrating the relationship between the camera shake correction amount s and the size r of the reliable focus area when among the four areas FA#0, FA#1, FA#2, and FA#3 illustrated in FIG. 6, only area FA#3 can serve as the focus area.

In FIG. 8B, when the camera shake correction amount s is in the range of 0 to $s_3$, in the AF reliability determination, the area FA#3, whose size r is size $r_3$, is determined as the reliable focus area. Namely, the whole area of the image captured by the image sensor 54 is determined as the reliable focus area.

Further, when the camera shake correction amount s is more than (exceeds) $s_3$, in the AF reliability determination, it is determined that there is no reliable focus area.

Then, in the focus control unit 61, based on the determination result of the AF reliability determination, the same focus control as in FIG. 8A is performed.

Namely, if area FA#3 is determined as the reliable focus area, in the focus control unit 61, based on the phase difference information obtained from the phase difference pixels in that focus area, control of the movement of the shake correction lens is performed as the AF focus control.

Further, if it is determined that there is no reliable focus area, rather than AF focus control based on a phase difference method, AF focus control that is based on a contrast method is performed.

Therefore, in FIG. 8B, when phase difference method-based AF focus control is performed, that focus control is carried out based on phase difference information obtained from all of the phase difference pixels included in the image sensor 54.

In FIGS. 8A and 8B, although discrete sizes are employed as the size (of the area that will serve as) the reliable focus area, continuous sizes may also be employed as the size of the reliable focus area.

FIG. 8C is a diagram illustrating the relationship between the camera shake correction amount s and the size r of the reliable focus area when a continuous size is employed as the size of the reliable focus area.

As described in FIGS. 5 and 6, the greater the camera shake correction amount, the lower the reliability of (the greater the error in) the phase difference information. Further, the more phase difference pixels far away from the optical axis that are included in the focus area for obtaining the phase difference information, namely, in the present embodiment, since a rectangular area centered about the optical axis is employed as the focus area, the greater the size of the focus area, the lower the reliability of the phase difference information.

Consequently, in FIG. 8C, the greater the camera shake correction amount, the smaller the size of the area (in the present embodiment, an area including only phase difference pixels close to the optical axis) that is determined as the reliable focus area.

In FIG. 8, although the AF reliability determination was described by focusing only on one axis direction, the x axis or the y axis, in a two-dimensional coordinate system defined by a horizontal direction x axis and a vertical direction y axis with the optical axis as the origin, in the AF reliability determination, the reliable focus area can be determined for the x direction and the y direction, respectively.

Figure 9:
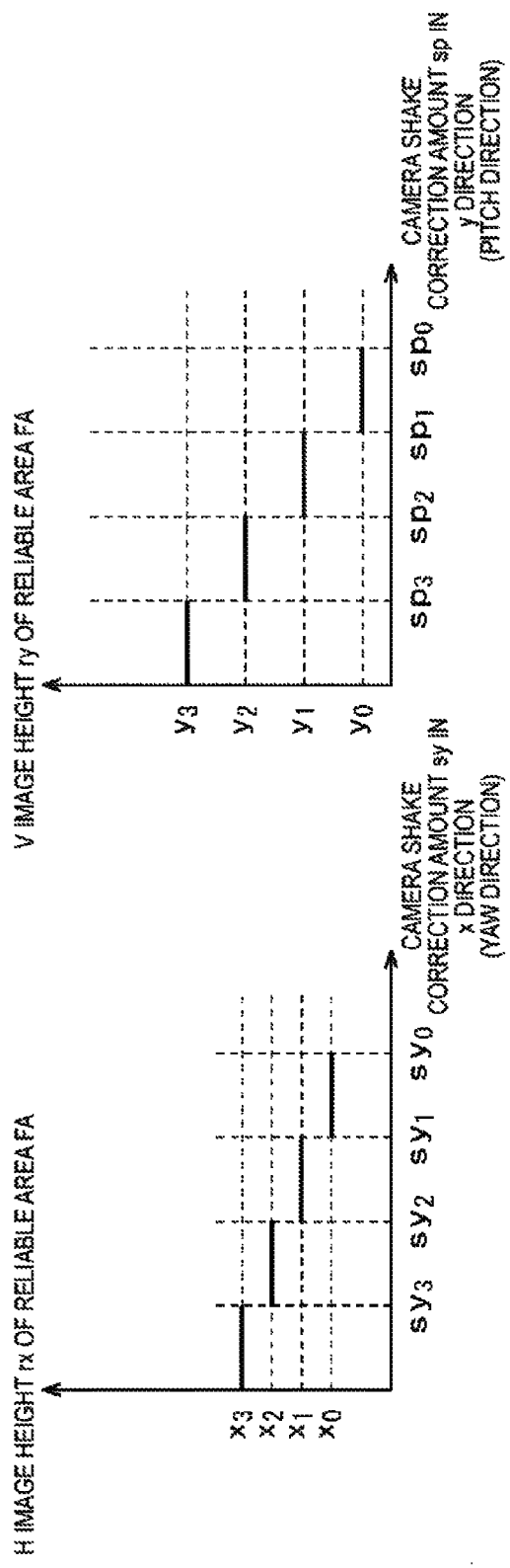
FIG. 9 is a diagram illustrating AF reliability determination for determining a reliable focus area in the x direction and the y direction, respectively.

FIG. 9 is a diagram illustrating AF reliability determination for determining a reliable focus area in the x direction and the y direction, respectively.

Namely, FIG. 9 illustrates the relationship between the camera shake correction amount s=(sy,sp) (=(x component, y component)) and the size r=(rx, ry) of the reliable focus area in the x direction and the y direction, respectively.

It is noted that in FIG. 9, similar to the case illustrated in FIG. 8A, for example, discrete sizes are employed as the size (of the area that will serve as) the reliable focus area.

Further, in FIG. 9, $sy=sy_3$, $sy_2$, $sy_1$, and $sy_0$ represents the (magnitude of) the x direction component (amount of camera shake in the x direction) of the camera shake correction amount s, increasing in order of $sy_3$, $sy_2$, $sy_1$, and $sy_0$ (wherein $0<sy_3<sy_2<sy_1<sy_0$).

In addition, in FIG. 9, $sp=sp_3$, $sp_2$, $sp_1$, and $sp_0$ represents the (magnitude of) the y direction component (amount of camera shake in the y direction) of the camera shake correction amount s, increasing in order of $sp_3$, $sp_2$, $sp_1$, and $sp_0$ (wherein $0<sp_3<sp_2<sp_1<sp_0$).

Still further, in FIG. 9, $rx=x_0$, $x_1$, $x_2$, and $x_3$ represents the x coordinate of the point at the top right of the focus area as the size in the x direction of (the area that will serve as) the focus area, increasing in order of $x_0$, $x_1$, $x_2$, and $x_3$ (wherein $0<x_0<x_1<x_2<x_3$).

Moreover, in FIG. 9, $ry=y_0$, $y_1$, $y_2$, and $y_3$ represents the y coordinate of the point at the top right of the focus area as the size in the y direction of (the area that will serve as) the focus area, increasing in order of $y_0$, $y_1$, $y_2$, and $y_3$ (wherein $0<y_0<y_1<y_2<y_3$).

The focus area with size $r=(x_i,y_i)$ matches the area FA#i of FIG. 6 (i=0, 1, 2, 3).

Here, when the amount of camera shake detected by a not-illustrated gyroscope is represented as the amount of camera shake in the yaw direction and the amount of camera shake in the pitch direction, the amount of camera shake in the yaw direction corresponds to the camera shake correction amount sy in the x direction, and the amount of camera shake in the pitch direction corresponds to the camera shake correction amount sp in the y direction.

In FIG. 9, if the camera shake correction amount sy in the x direction is in the minimum range of 0 to $sy_3$, in the AF reliability determination, the area whose size rx in the x direction is the largest size $x_3$ is determined as the reliable focus area.

Further, if the camera shake correction amount sy in the x direction is in the second smallest range of $sy_3$ to $sy_2$, in the AF reliability determination, the area whose size rx in the x direction is the second largest size $x_2$ is determined as the reliable focus area.

In addition, if the camera shake correction amount sy in the x direction is in the third smallest range of $sy_2$ to $sy_1$, in the AF reliability determination, the area whose size rx in the x direction is the third largest size $x_1$ is determined as the reliable focus area.

Still further, if the camera shake correction amount sy in the x direction is in the fourth smallest range of $sy_1$ to $sy_0$, in the AF reliability determination, the area whose size rx in the x direction is the smallest (the fourth largest) size $x_0$ is determined as the reliable focus area.

Moreover, when the camera shake correction amount sy in the x direction is more than (exceeds) $sy_0$, in the AF reliability determination, the area whose size rx in the x direction is zero is determined as the reliable focus area. Namely, when the camera shake correction amount sy is more than $sy_0$, it is determined that there is no reliable focus area.

Further, in FIG. 9, if the camera shake correction amount sp in the y direction is in the minimum range of 0 to $sp_3$, in the AF reliability determination, the area whose size ry in the y direction is the largest size $y_3$ is determined as the reliable focus area.

In addition, if the camera shake correction amount sp in the y direction is in the second smallest range of $sp_3$ to $sp_2$, in the AF reliability determination, the area whose size ry in the y direction is the second largest size $y_2$ is determined as the reliable focus area.

Still further, if the camera shake correction amount sp in the y direction is in the third smallest range of $sp_2$ to $sp_1$, in the AF reliability determination, the area whose size ry in the y direction is the third largest size $y_1$ is determined as the reliable focus area.

Still even further, if the camera shake correction amount sp in the y direction is in the fourth smallest range of $sp_1$ to $sp_0$, in the AF reliability determination, the area whose size ry in the y direction is the smallest (the fourth largest) size $y_0$ is determined as the reliable focus area.

Moreover, when the camera shake correction amount sp in the y direction is more than (exceeds) $sp_0$, in the AF reliability determination, the area whose size ry in the y direction is zero is determined as the reliable focus area. Namely, when the camera shake correction amount sp is more than $sp_0$, it is determined that there is no reliable focus area.

Therefore, for example, if the camera shake correction amount sy in the x direction is in the range of 0 to $sy_3$, and, the camera shake correction amount sp in the y direction is in the range of $sp_1$ to $sp_0$, in the AF reliability determination, the area whose size rx in the x direction is size $x_3$ and whose size ry in the y direction is the size $y_0$ is determined as the reliable focus area.

Further, for example, if the camera shake correction amount sy in the x direction is more than $sy_0$, or the camera shake correction amount sp in the y direction is more than $sp_0$, in the AF reliability determination, it is determined that there is no reliable focus area.

Figure 10:
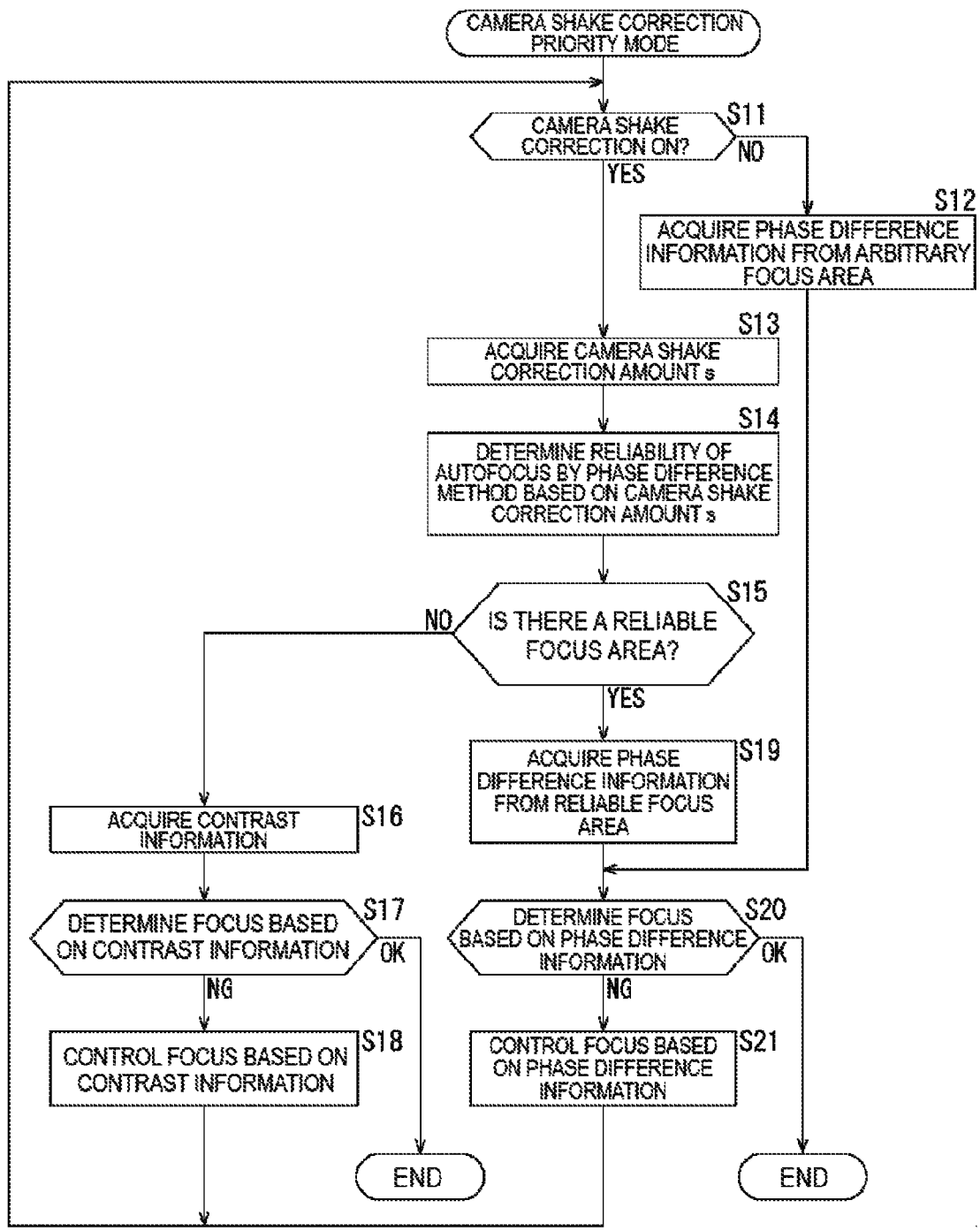
FIG. 10 is a flowchart illustrating AF processing in a camera shake correction priority mode.

FIG. 10 is a flowchart illustrating AF processing in camera shake correction priority mode.

In step S11, the focus control unit 61 determines whether camera shake correction is ON (whether the camera shake correction is functioning).

If it is determined in step S11 that camera shake correction is not ON, namely, that an error in the phase difference information caused by camera shake correction will not be produced, the processing proceeds to step S12. In step S12, the focus control unit 61 acquires phase difference information from (the phase difference pixels of) an arbitrary focus area, and the processing proceeds to step S20.

Namely, when an error in the phase difference information caused by camera shake correction will not be produced, the focus control unit 61 sets, for example, the whole area of the image output by the image sensor 54, an area having a predetermined size that includes a user specified position on the image, an area encompassing a person's face on the image and the like as the focus area, and acquires phase difference information from this focus area.

When the whole area of the image output by the image sensor 54 is set as the focus area, in the focus control performed based on that phase difference information, focus control is performed so that the whole of the image output by the image sensor 54 is, on average, in focus.

When an area having a predetermined size that includes a user specified position on the image output by the image sensor 54 is set as the focus area, in the focus control performed based on that phase difference information, focus control is performed so that the object appearing in the position specified by the user is in focus on the image output by the image sensor 54.

When an area encompassing a person's face on the image output by the image sensor 54 is set as the focus area, in the focus control performed based on that phase difference information, focus control is performed so that the person's face appearing in the image output by the image sensor 54 is in focus.

On the other hand, if it is determined in step S11 that camera shake correction is ON, namely, that an error in the phase difference information caused by camera shake correction may be produced, the processing proceeds to step S13. In step S13, the focus control unit 61 acquires an average value of the camera shake correction amount within the exposure time of the capturing of the image by the image sensor 54 performed immediately before as the current camera shake correction amount s, and the processing then proceeds to step S14.

In step S14, the focus control unit 61 performs an AF reliability determination based on the camera shake correction amount s, namely, determines the reliable focus area as illustrated in FIGS. 8 and 9, for example, and then the processing proceeds to step S15.

In step S15, the focus control unit 61 determines whether there is a reliable focus area based on the AF reliability determination performed in step S14.

If it is determined in step S15 that there is no reliable focus area, namely, that because the camera shake correction amount s is large, phase difference information within the tolerance cannot be obtained from the phase difference pixels included in the image sensor 54, so that there is a high likelihood that highly-accurate AF could not be realized if focus control were performed based on a phase difference method, the processing proceeds to step S16, and AF focus control that is not based on a phase difference method, for example, AF focus control that is based on a contrast method or the like, is performed.

Namely, in step S16, the focus control unit 61 acquires (determines) contrast information representing the contrast of an image output by the image sensor 54 (imaging unit 11), and the processing then proceeds to step S17.

Here, as the contrast information, information representing the whole, or a part, of the contrast of the image output by the image sensor 54 may be determined. As contrast information representing a part of the contrast of the image output by the image sensor 54, the contrast of an area having a predetermined size that includes a user specified area, the contrast of an area encompassing a person's face on that image, as well as information representing the contrast of a predetermined area can be used.

In step S17, the focus control unit 61 performs focus determination based on the contrast information.

Namely, in step S17, the focus control unit 61 determines whether the focus state is in-focus based on the contrast information.

If it is determined in step S17 that the focus state is not in-focus, namely, if the contrast represented by the contrast information is at a maximum, the processing proceeds to step S18. In step S18, the focus control unit 61 performs focus control based on the contrast information, namely, moves the shake correction lens of the optical system 51 based on the contrast information. Then, the processing returns to step S11.

Further, in step S18, if it is determined that the focus state is in-focus, the AF processing is finished.

Thus, if phase difference information within the tolerance cannot be obtained from the phase difference pixels included in the image sensor 54 because the camera shake correction amount s is large, so that there is a high likelihood that highly-accurate AF cannot be realized if focus control were performed based on a phase difference method, in camera shake correction priority mode, camera shake correction is not especially limited in order to prioritize camera shake correction.

Further, instead of a phase difference method, in which there is a high likelihood that highly-accurate AF cannot be realized, the AF focus control is carried out by a contrast method.

Therefore, in this case, although it takes longer for the focus state to be in-focus than when performing phase difference method-based AF focus control, since the camera shake correction is not limited, the capturing of a so-called blurry image, which is a defective image, can be prevented.

On the other hand, in step S15, if it is determined that there is a reliable focus area, namely, if phase difference information in which the error produced by camera shake correction is within the tolerance can be obtained, the processing proceeds to step S19, and phase difference method-based AF focus control is subsequently performed using phase difference information obtained from the reliable focus area.

Namely, in step S19, the focus control unit 61 acquires (determines) from the pixel value of the phase difference pixels in the reliable focus area phase difference information of an image output by the image sensor 54, and the processing then proceeds to step S20.

In step S20, the focus control unit 61 performs focus determination based on phase difference information.

Namely, in step S20, the focus control unit 61 determines whether the focus state is in-focus based on phase difference information obtained from the focus area.

If it is determined in step S20 that the focus state is not in-focus, the processing proceeds to step S21. In step S21, the focus control unit 61 performs focus control based on phase difference information, namely, moves the shake correction lens of the optical system 51 based on phase difference information. Then, the processing returns to step S11.

Further, in step S21, if it is determined that the focus state is in-focus, the AF processing is finished.

Thus, even if camera shake correction is performed, if there is a focus area (a reliable focus area) from which phase difference information is within the tolerance, in camera shake correction priority mode, phase difference method-based AF focus control can be carried out based on phase difference information obtained from the reliable focus area without any particular limitations on the camera shake correction.

Therefore, in this case, rapid and accurate AF can be realized by phase difference method-based AF focus control while also allowing camera shake correction to function. Consequently, the capturing of a so-called blurry image, which is a defective image, can be prevented.

Further, generally, since imaging is performed so that the object (main object) that the user is trying to capture is in the vicinity of the optical axis, and since in the present embodiment the reliable focus area includes the vicinity of the optical axis, a photograph can be obtained in which the main object is in-focus.

In addition, the AF reliability determination, namely, the determination of the reliability of phase difference information, and thus the determination of the focus area (reliable focus area) obtained from phase difference information within the tolerance, is performed using the camera shake correction amount. This determination is not dependent on the configuration of the optical system 51, such as the performance of camera shake correction by movement of the shake correction lens in the optical system 51.

Therefore, even if the digital camera illustrated in FIG. 1 is an interchangeable-lens type digital camera on which various interchangeable lenses can be interchanged, in the main body of the digital camera, information specific to an interchangeable lens, such as the configuration of the interchangeable lens mounted on the main body, is not necessary.

(AF Priority Mode)

FIG. 11 is a diagram illustrating a camera shake correction amount that is limited based on a focus area in AF priority mode.

Here, as described above, in camera shake correction priority mode, in order to prioritize camera shake correction, camera shake correction is not limited, rather, the focus area used in phase difference method-based AF focus control is limited to a reliable focus area, namely, a focus area capable of obtaining phase difference information in which an error caused by camera shake correction is within a tolerance.

In contrast, in AF priority mode, phase difference method-based AF focus control is prioritized. Consequently, there are limitations on camera shake correction.

Namely, in AF priority mode, an area including a position that is to be brought into focus by phase difference method-based AF focus control is set as the focus area. Further, control is carried out to limit the camera shake correction amount so that this focus area is the reliable focus area, namely, the error in phase difference information obtained from the focus area is within the tolerance.

FIG. 11A is a diagram illustrating the relationship between the size r of (the area FA that will serve as) the reliable focus area and the maximum value s of the (magnitude of) a camera shake correction amount when, as illustrated in FIG. 6, the four areas FA#0, FA#1, FA#2, and FA#3 are set as the focus area, for example.

Here, the maximum value s of the camera shake correction amount at which the focus area is the reliable focus area will also be referred to as permissible correction amount s.

Here, in FIG. 11, to simplify the description, similar to the case illustrated in FIG. 8, attention is paid to only one axis direction, the x axis or the y axis, in a two-dimensional coordinate system defined by a horizontal direction x axis and a vertical direction y axis with the optical axis as the origin.

Further, the permissible correction amount s increases in order of $s_3$, $s_2$, $s_1$, and $s_0$ (wherein $0<s_3<s_2<s_1<s_0$), and the focus area size r increases in order of $r_0$, $r_1$, $r_2$, and $r_3$ (wherein $0<r_0<r_1<r_2<r_3$).

In FIG. 11A, when the area FA#3, whose size r is the largest size $r_3$, is set as the focus area, based on that focus area, the value $s_3$, which is the smallest among $s_0$ to $s_3$, is determined as the permissible correction amount, and the camera shake correction amount is limited to that permissible correction amount $s_3$.

Further, when the area FA#2, whose size r is the second largest size $r_2$, is set as the focus area, based on that focus area, the value $s_2$, which is the second smallest among $s_0$ to $s_3$, is determined as the permissible correction amount, and the camera shake correction amount is limited to that permissible correction amount $s_2$.

In addition, when the area FA#1, whose size r is the third largest size $r_3$, is set as the focus area, based on that focus area, the value $s_3$, which is the third smallest among $s_0$ to $s_3$, is determined as the permissible correction amount, and the camera shake correction amount is limited to that permissible correction amount $s_1$.

Still further, when the area FA#0, whose size r is the fourth largest (the smallest) size $r_0$, is set as the focus area, based on that focus area, the value $s_0$, which is the fourth smallest (the largest) among $s_0$ to $s_3$, is determined as the permissible correction amount, and the camera shake correction amount is limited to that permissible correction amount $s_0$.

FIG. 11B is a diagram illustrating the relationship between the size r of the focus area and the permissible correction amount s when among the four areas FA#0, FA#1, FA#2, and FA#3 illustrated in FIG. 6, only area FA#3 can serve as the focus area.

In FIG. 11B, normally, the area FA#3, whose size r is size $r_3$, namely, the whole of the area of the image captured by the image sensor 54, is set as the focus area. Further, the value size $s_3$ is determined as the permissible correction amount based on that focus area, and the camera shake correction amount is limited to that permissible correction amount $s_3$.

In FIGS. 11A and 11B, although discrete sizes are employed as the size (of the area that will serve as) the focus area, continuous sizes may also be employed as the size of the focus area.

FIG. 11C is a diagram illustrating the relationship between the size r of the focus area and the permissible correction amount s when a continuous size is employed as the size of the focus area.

As described in FIGS. 5 and 6, the more phase difference pixels far away from the optical axis that are included in the focus area, namely, in the present embodiment, since a rectangular area centered about the optical axis is employed as the focus area, the greater the size of the focus area, the more the camera shake correction amount is limited to a smaller value.

Consequently, in FIG. 11C, the greater the size r of the focus area, the smaller the value of the permissible correction amount s that is determined. The camera shake correction amount is limited to that permissible correction amount s.

Figure 12:
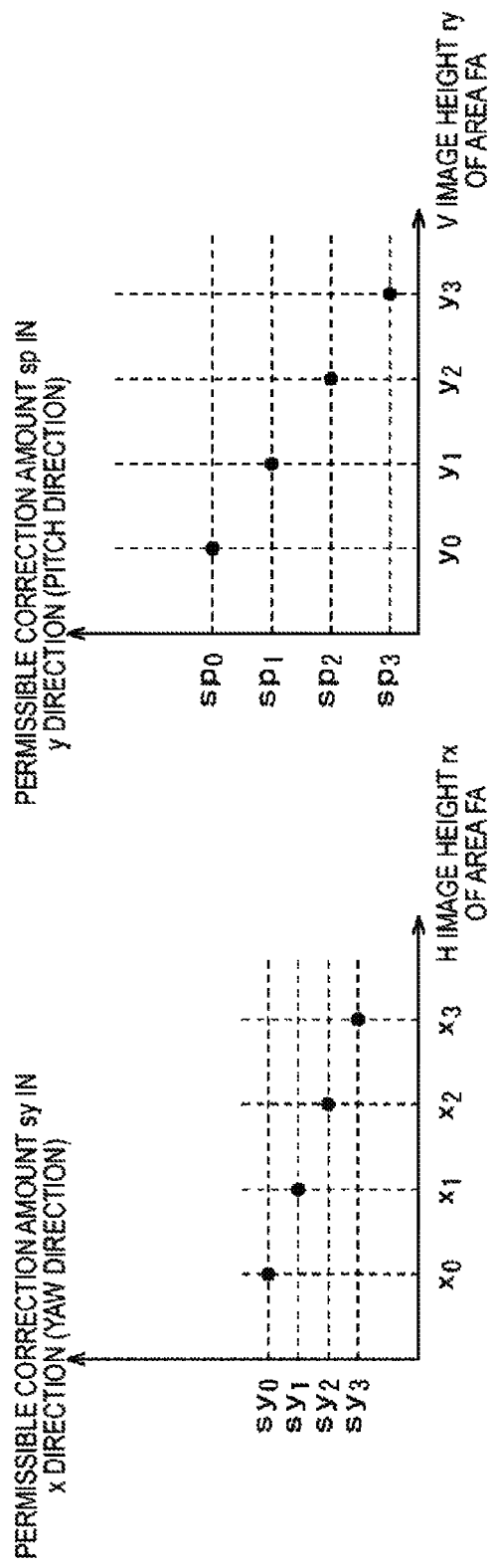
FIG. 12 is a diagram illustrating a camera shake correction amount that is limited based on a focus area in the x direction and the y direction, respectively.

FIG. 12 is a diagram illustrating a camera shake correction amount that is limited based on a focus area in the x direction and the y direction, respectively.

Namely, FIG. 12 illustrates the relationship between the size r=(rx, ry) of the focus area and the permissible correction amount s=(sy,sp) in the x direction and the y direction, respectively.

It is noted that in FIG. 12, similar to the case illustrated in FIG. 11A, for example, discrete sizes are employed as the size (of the area that will serve as) the reliable focus area.

Further, in FIG. 12, $sy=sy_3$, $sy_2$, $sy_1$, and $sy_0$ represents the (magnitude of) the x direction component of the permissible correction amount s, increasing in order of $sy_3$, $sy_2$, $sy_1$, and $sy_0$ (wherein $0<sy_3<sy_2<sy_1<sy_0$).

In addition, in FIG. 12, $sp=sp_3$, $sp_2$, $sp_1$, and $sp_0$ represents the (magnitude of) the y direction component of the permissible correction amount s, increasing in order of $sp_3$, $sp_2$, $sp_1$, and $sp_0$ (wherein $0<sp_3<sp_2<sp_1<sp_0$).

Still further, in FIG. 12, $rx=x_0$, $x_1$, $x_2$, and $x_3$ represents the x coordinate of the point at the top right of the focus area as the size in the x direction of the focus area, increasing in order of $x_0$, $x_1$, $x_2$, and $x_3$ (wherein $0<x_0<x_1<x_2<x_3$).

Moreover, in FIG. 12, $ry=y_0$, $y_1$, $y_2$, and $y_3$ represents the y coordinate of the point at the top right of the focus area as the size in the y direction of the focus area, increasing in order of $y_0$, $y_1$, $y_2$, and $y_3$ (wherein $0<y_0<y_1<y_2<y_3$).

The focus area with size $r=(x_i,y_i)$ matches the area FA#i of FIG. 6 (i=0, 1, 2, 3).

In FIG. 12, when the area whose size (H image height) rx in the x direction is the largest size $x_3$ is set as the focus area, based on that focus area, the smallest value $sy_3$ among $sy_0$ to $sy_3$ is determined as the permissible correction amount sy in the x direction, and the camera shake correction amount in the x direction (yaw direction) is limited to that permissible correction amount $sy_3$ in the x direction.

Further, when the area whose size rx in the x direction is the second largest size $x_2$ is set as the focus area, based on that focus area, the second smallest value $sy_2$ among $sy_0$ to $sy_3$ is determined as the permissible correction amount sy in the x direction, and the camera shake correction amount in the x direction is limited to that permissible correction amount $sy_2$ in the x direction.

In addition, when the area whose size rx in the x direction is the third largest size $x_1$ is set as the focus area, based on that focus area, the second smallest value $sy_1$ among $sy_0$ to $sy_3$ is determined as the permissible correction amount sy in the x direction, and the camera shake correction amount in the x direction is limited to that permissible correction amount $sy_1$ in the x direction.

Still further, when the area whose size rx in the x direction is the fourth largest (the smallest) size $x_0$ is set as the focus area, based on that focus area, the fourth smallest value (the largest) $sy_0$ among $sy_0$ to $sy_3$ is determined as the permissible correction amount sy in the x direction, and the camera shake correction amount in the x direction is limited to that permissible correction amount $sy_0$ in the x direction.

The camera shake correction amount is also limited in the y direction in the same way as in the x direction.

Namely, when the area whose size (V image height) ry in the y direction is the largest size $y_3$ is set as the focus area, based on that focus area, the smallest value $sp_3$ among $sp_0$ to $sp_3$ is determined as the permissible correction amount sp in the y direction, and the camera shake correction amount in the y direction (pitch direction) is limited to that permissible correction amount $sp_3$ in the y direction.

Further, when the area whose size ry in the y direction is the second largest size $y_2$ is set as the focus area, based on that focus area, the second smallest value $sp_2$ among $sp_0$ to $sp_3$ is determined as the permissible correction amount sp in the y direction, and the camera shake correction amount in the y direction is limited to that permissible correction amount $sp_2$ in the y direction.

In addition, when the area whose size ry in the y direction is the third largest size $y_0$ is set as the focus area, based on that focus area, the third smallest value $sp_1$ among $sp_0$ to $sp_3$ is determined as the permissible correction amount sp in the y direction, and the camera shake correction amount in the y direction is limited to that permissible correction amount $sp_1$ in the y direction.

Still further, when the area whose size ry in the y direction is the fourth largest (the smallest) size $y_0$ is set as the focus area, based on that focus area, the fourth smallest (the largest) value $sp_0$ among $sp_0$ to $sp_3$ is determined as the permissible correction amount sp in the y direction, and the camera shake correction amount in the y direction is limited to that permissible correction amount $sp_0$ in the y direction.

Therefore, when the focus area is, for example, the area FA#0 illustrated in FIG. 6 whose coordinates at the top right point are $(x_0,y_0)$, the camera shake correction amount is limited to the permissible correction amount $sy_0$ in the x direction and the permissible correction amount $sp_0$ in the y direction.

FIG. 13 is a flowchart illustrating AF processing in an AF priority mode.

In step S31, the focus control unit 61 sets the focus area, and the processing then proceeds to step S32.

Here, in the focus area setting, for example, any of the areas FA#0 to area FA#3 illustrated in FIG. 6 can be set as a default area, and that default area can be set as the focus area.

Further, for example, when a predetermined position on an image output from the image sensor 54 and displayed on the input/output panel 14 is specified by a touch or the like, the area having a predetermined size which includes the position specified by the user can be set as the focus area.

In addition, for example, when the digital camera has a function for recognizing a predetermined object, such as a person's face, the predetermined object can be recognized from the image output by the image sensor 54, and the area encompassing that predetermined object can be set as the focus area.

When an area having a predetermined size that includes a user specified position on the image output by the image sensor 54 is set as the focus area, AF focus control is performed so that the object appearing in the position specified by the user is in-focus on the image output by the image sensor 54.

Further, when an area encompassing a person's face, for example, as the predetermined object that is on the image output by the image sensor 54 is set as the focus area, AF focus control is performed so that the person's face appearing in the image output by the image sensor 54 is in-focus.

In step S32, the focus control unit 61 acquires focus area information for specifying the focus area, and the processing then proceeds to step S33.

Here, an example of focus area information that can be employed includes information for specifying the four apexes of a rectangle as the focus area (coordinates of the top left apex of the focus area, the length of the width and the height of the focus area, and the two apexes that face each other across the center etc.).

In step S33, the focus control unit 61 determines whether camera shake correction is ON (whether camera shake correction is functioning).

If it is determined in step S33 that camera shake correction is ON, namely, that an error in the phase difference information caused by camera shake correction may be produced, the processing proceeds to step S34. In step S34, the focus control unit 61 performs camera shake correction control based on the focus area information, and the processing proceeds to step S35.

Namely, in step S34, the focus control unit 61 determines the permissible correction amount s at which the focus area specified from the focus area information is the reliable focus area, namely the permissible correction amount s at which the error in the phase difference information obtained from the focus area is within the tolerance, in the manner described with reference to FIGS. 11 and 12, for example.

Further, the focus control unit 61 controls the camera shake correction control unit 62 so that the camera shake correction amount of camera shake correction is limited to the permissible correction amount s. As a result, the camera shake correction control unit 62 controls camera shake correction so that the camera shake correction amount is limited to the permissible correction amount s. Consequently, camera shake correction is performed with the permissible correction amount s as the maximum camera shake correction amount, for example.

On the other hand, if it is determined in step S33 that camera shake correction is not ON, since it is not necessary to control camera shake correction, the processing skips step S34, and proceeds to step S35. In step S35, the focus control unit 61 acquires (determines) the phase difference information from the (phase difference pixels) of the focus area, and the processing then proceeds to step S36.

In step S36, similar to the case of step S20 in FIG. 10, the focus control unit 61 performs focus determination based on phase difference information.

Namely, in step S36, the focus control unit 61 determines whether the focus state is in-focus based on phase difference information obtained from the focus area.

If it is determined in step S36 that the focus state is not in-focus, the processing proceeds to step S37. In step S37, the focus control unit 61 performs focus control based on the phase difference information, namely, moves the shake correction lens of the optical system 51 based on the phase difference information. Then, the processing returns to step S31.

Further, in step S37, if it is determined that the focus state is in-focus, the AF processing is finished.

Thus, in AF priority mode, since camera shake correction is limited so that the error in phase difference information obtained from a focus area is within a tolerance, rapid and accurate AF can be realized by phase difference method-based AF focus control while also allowing camera shake correction to function as much as possible. Consequently, the capturing of a so-called blurry image, which is a defective image, can be prevented.

Further, since the focus area can be set by a user specification, a photograph in which the main object is in-focus can be easily obtained by, for example, specifying the object (main object) that the user is trying to capture on the image displayed on the input/output panel 14 (FIG. 1).

Here, in the present specification, the processing performed by the computer (a processor such as a CPU) based on a program does not have to be carried out in temporal sequence according to the order described in the flowcharts. Namely, the processing performed by the computer based on a program also includes processing that is executed in parallel or individually (e.g., parallel processing or object-based processing).

Further, the program may be processed by one computer, or processed in a distributed manner by a plurality of computers.

It should be understood by those skilled in the art that various modifications, combinations, sub-combinations and alterations may occur depending on design requirements and other factors insofar as they are within the scope of the appended claims or the equivalents thereof.

For example, the camera shake correction priority mode and the AF priority mode can both be implemented, or just one of these modes may be implemented.

Further, the focus area may have some other shape than a rectangle, for example, such as a circular shape, or a cross shape.

In addition, as the focus area, in addition to one continuous area, a plurality of discrete areas (e.g., a small rectangular area centered about the optical axis and a small rectangular area centered about a predetermined position near a corner away from the optical axis etc.) can also be employed.

Additionally, the present technology may also be configured as below.

(1) A processing apparatus including:

a camera shake correction control unit configured to, based on a focus area in which pixel values of phase difference pixels is used in focus control among areas of an image output by an image sensor, control camera shake correction performed by changing a relative positional relationship in a direction perpendicular to an optical axis in an optical system between the image sensor that includes as some of pixels, phase difference pixels that are pixels for obtaining phase difference information to be used in focus control based on a phase difference method, and the optical system, which is for forming an image on the image sensor from light from an object.

(2) The processing apparatus according to (1), wherein the camera shake correction control unit is configured to limit a camera shake correction amount of the camera shake correction.

(3) The processing apparatus according to (1) or (2), further including a focus control unit configured to set the focus area and perform focus control based on a phase difference method based on the phase difference information obtained from the focus area.

(4) The processing apparatus according to (3), wherein the focus control unit is configured to set the focus area based on a user operation.

(5) The processing apparatus according to any one of (1) to (4), wherein the camera shake correction control unit is configured to control camera shake correction by moving the image sensor or the optical system in a direction perpendicular to the optical axis.

(6) The processing apparatus according to any one of (1) to (5), which is a digital camera further including the image sensor.

(7) A processing method including:
controlling, based on a focus area in which pixel values of phase difference pixels is used in focus control among areas of an image output by an image sensor, camera shake correction performed by changing a relative positional relationship in a direction perpendicular to an optical axis in an optical system between the image sensor that includes as some of pixels, phase difference pixels that are pixels for obtaining phase difference information to be used in focus control based on a phase difference method, and the optical system, which is for forming an image on the image sensor from light from an object.

(8) A program for causing a computer to function as a camera shake correction control unit configured to, based on a focus area in which pixel values of phase difference pixels is used in focus control among areas of an image output by an image sensor, control camera shake correction performed by changing a relative positional relationship in a direction perpendicular to an optical axis in an optical system between
the image sensor that includes as some of pixels, phase difference pixels that are pixels for obtaining phase difference information to be used in focus control based on a phase difference method, and
the optical system, which is for forming an image on the image sensor from light from an object.

(1) A processing apparatus including:
a focus control unit configured to perform a reliability determination for determining a reliability of phase difference information based on a camera shake correction amount of camera shake correction performed by changing a relative positional relationship in a direction perpendicular to an optical axis in an optical system between
an image sensor that includes as some of pixels, phase difference pixels that are pixels for obtaining phase difference information to be used in focus control based on a phase difference method, and
the optical system, which is for forming an image on the image sensor from light from an object.

(2) The processing apparatus according to (1), wherein the focus control unit is configured to perform focus control based on a phase difference method based on a determination result of the reliability determination.

(3) The processing apparatus according to (1) or (2), wherein the focus control unit is configured to
in the reliability determination, determine a reliable focus area from which the phase difference information that is within a tolerance can be obtained from among focus areas in which pixel values of the phase difference pixels are used in focus control from among areas of an image output by the image sensor, and
perform focus control based on a phase difference method based on the phase difference information obtained from the reliable focus area.

(4) The processing apparatus according to (3), wherein when there is no reliable focus area, the focus control unit is configured to perform focus control based on method other than a phase difference method.

(5) The processing apparatus according to any one of (1) to (4), further including a camera shake correction control unit configured to control camera shake correction that is performed by moving the image sensor or the optical system in the direction perpendicular to the optical axis.

(6) The processing apparatus according to any one of (1) to (5), which is a digital camera further including the image sensor.

(7) A processing method including performing a reliability determination for determining a reliability of phase difference information based on a camera shake correction amount of camera shake correction performed by changing a relative positional relationship in a direction perpendicular to an optical axis in an optical system between an image sensor that includes as some of its pixels, phase difference pixels that are pixels for obtaining phase difference information to be used in focus control based on a phase difference method, and the optical system, which is for forming an image on the image sensor from light from an object.

(8) A program for causing a computer to function as a focus control unit configured to perform a reliability determination for determining a reliability of phase difference information based on a camera shake correction amount of camera shake correction performed by changing a relative positional relationship in a direction perpendicular to an optical axis in an optical system between an image sensor that includes as some of its pixels, phase difference pixels that are pixels for obtaining phase difference information to be used in focus control based on a phase difference method, and the optical system, which is for forming an image on the image sensor from light from an object.

(1) A processing apparatus including:
a camera shake correction control unit configured to, based on a focus area in which pixel values of phase difference pixels is used in focus control among areas of an image output by an image sensor, control camera shake correction performed by changing a relative positional relationship in a direction perpendicular to an optical axis in an optical system between
the image sensor that includes as some of pixels, phase difference pixels that are pixels for obtaining phase difference information to be used in focus control based on a phase difference method, and
the optical system, which is for forming an image on the image sensor from light from an object.

(2) The processing apparatus according to (1), wherein the camera shake correction control unit is configured to limit a camera shake correction amount of the camera shake correction.

(3) The processing apparatus according to (1) or (2), further including a focus control unit configured to set the focus area and perform focus control based on a phase difference method based on the phase difference information obtained from the focus area.

(4) The processing apparatus according to (3), wherein the focus control unit is configured to set the focus area based on a user operation.

(5) The processing apparatus according to any one of (1) to (4), wherein the camera shake correction control unit is configured to control camera shake correction by moving the image sensor or the optical system in a direction perpendicular to the optical axis.

(6) The processing apparatus according to any one of (1) to (5), which is a digital camera further including the image sensor.

(7) A processing method including:

controlling, based on a focus area in which pixel values of phase difference pixels is used in focus control among areas of an image output by an image sensor, camera shake correction performed by changing a relative positional relationship in a direction perpendicular to an optical axis in an optical system between the image sensor that includes as some of pixels, phase difference pixels that are pixels for obtaining phase difference information to be used in focus control based on a phase difference method, and the optical system, which is for forming an image on the image sensor from light from an object.

(8) A program for causing a computer to function as a camera shake correction control unit configured to, based on a focus area in which pixel values of phase difference pixels is used in focus control among areas of an image output by an image sensor, control camera shake correction performed by changing a relative positional relationship in a direction perpendicular to an optical axis in an optical system between the image sensor that includes as some of pixels, phase difference pixels that are pixels for obtaining phase difference information to be used in focus control based on a phase difference method, and the optical system, which is for forming an image on the image sensor from light from an object.

The present disclosure contains subject matter related to that disclosed in Japanese Priority Patent Application JP 2012-199125 filed in the Japan Patent Office on Sep. 11, 2012, the entire content of which is hereby incorporated by reference.

What is claimed is:

1. A processing apparatus, comprising:
   an image sensor with a plurality of phase difference pixels; and
   one or more processors configured to control a camera shake correction, the one or more processors are further configured to:
      determine a permissible camera shake correction amount based on a focus area corresponding to the image sensor, wherein the focus area includes a part of the plurality of phase difference pixels, and the focus area is set prior to the determination of the permissible camera shake correction amount;
      execute the camera shake correction corresponding to a detected camera shake correction amount that is less than the permissible camera shake correction amount; and
      determine a focus state of light received at the focus area, wherein the focus state is determined as in-focus based on phase difference information which is obtained from the part of the plurality of phase difference pixels.

2. The processing apparatus according to claim 1,
   wherein the permissible camera shake correction amount is based on a distance between a first phase difference pixel and a center of the image sensor of the processing apparatus, wherein the plurality of phase difference pixels includes the first phase difference pixel, and
   wherein the one or more processors are further configured to:
      determine the focus state based on the phase difference information obtained from the part of the plurality of phase difference pixels that includes the first phase difference pixel.

3. The processing apparatus according to claim 2, wherein the one or more processors are further configured to set the focus area based on a user operation.

4. The processing apparatus according to claim 1, wherein the one or more processors are further configured to control a plurality of camera shake correction amounts based on a movement of the image sensor of the processing apparatus in a direction perpendicular to an optical axis of the processing apparatus, and
   wherein the image sensor is configured to receive light incident from an object.

5. A processing method, comprising:
   in a processing apparatus comprising an image sensor with a plurality of phase difference pixels:
   controlling a camera shake correction by:
      determining a permissible camera shake correction amount based on a focus area corresponding to the image sensor, wherein the focus area includes a part of the plurality of phase difference pixels, and the focus area is set prior to the determination of the permissible camera shake correction amount;
      executing the camera shake correction corresponding to a detected camera shake correction amount that is less than the permissible camera shake correction amount; and
      determining a focus state of light received at the focus area, wherein the focus state is determined as in-focus based on phase difference information which is obtained from the part of the plurality of phase difference pixels.

6. A non-transitory computer-readable medium having stored thereon, computer-executable instructions, which when executed by a processor, cause a processing apparatus to execute operations, the operations comprising:
   in the processing apparatus comprising an image sensor with a plurality of phase difference pixels:
   controlling a camera shake correction by:
      determining a permissible camera shake correction amount based on a focus area corresponding to the image sensor, wherein the focus area includes a part of the plurality of phase difference pixels, and the focus area is set prior to the determination of the permissible camera shake correction amount;
      executing the camera shake correction corresponding to a detected camera shake correction amount that is less than the permissible camera shake correction amount; and
      determining a focus state of light received at the focus area, wherein the focus state is determined as in-focus based on phase difference information which is obtained from the part of the plurality of phase difference pixels.

7. The processing apparatus according to claim 1, wherein the permissible camera shake correction amount is an amount by which one of the image sensor or a lens of the processing apparatus is moved in a direction perpendicular to an optical axis of the processing apparatus.

8. The processing apparatus according to claim 1, wherein the one or more processors are further configured to determine the permissible camera shake correction amount for a plurality of focus areas, and
   wherein the permissible camera shake correction amount for each of the plurality of focus areas is determined based on a size of each of the plurality of focus areas.

9. The processing apparatus according to claim 1, wherein the one or more processors are further configured to set a rectangular focus area centered about the image sensor of the processing apparatus.

10. The processing apparatus according to claim 9, wherein the permissible camera shake correction amount includes a first component and a second component,
wherein the first component is determined based on a length of the rectangular focus area and the second component is determined based on a breadth of the rectangular focus area.

11. The processing apparatus according to claim 2, wherein the one or more processors are further configured to determine the permissible camera shake correction amount based on positions of the part of the plurality of phase difference pixels associated with the focus area with respect to the center of the image sensor.

12. The processing apparatus according to claim 1, wherein the permissible camera shake correction amount is based on an average value of a plurality of camera shake correction amounts of a plurality of captured images, and wherein the average value is based on an exposure time of the image sensor.

13. The processing apparatus according to claim 1, wherein, based on a determination that detected camera shake amount is more than the permissible camera shake correction amount, the one or more processors are further configured to determine the focus state based on contrast information.

14. The processing apparatus according to claim 1, wherein the one or more processors are further configured to execute focus control based on a determination that the focus state is out-of-focus.

15. The processing apparatus according to claim 1, wherein the permissible camera shake correction amount is determined based on at least one of a determined table or a determined function.

16. The processing apparatus according to claim 1, wherein the permissible camera shake correction amount for x-axis is determined based on a first distance of the plurality of phase difference pixels from a center of the image sensor along the x-axis, and the permissible camera shake correction amount for y-axis is determined based on a second distance of the plurality of phase difference pixels from the center of the image sensor along the y-axis.

17. The processing apparatus according to claim 1, wherein a first focus area corresponding to a first phase difference pixel of the plurality of phase difference pixels results in a first permissible camera shake correction amount.

18. The processing apparatus according to claim 17, wherein a second focus area corresponding to a second phase difference pixel from the plurality of phase difference pixels results in a second permissible camera shake correction amount.

19. The processing apparatus according to claim 18, wherein the second permissible camera shake correction amount is smaller than the first permissible camera shake correction amount in a case where the second phase difference pixel is farther from a center of the image sensor than the first phase difference pixel.

20. The processing apparatus according to claim 1, wherein the focus state based on the phase difference information is determined by use of a phase difference auto focus method.

21. The processing apparatus according to claim 1, wherein the execution of the camera shake correction is based on control of a movement of a lens.

* * * * *